(12) United States Patent
Bankston et al.

(10) Patent No.: US 11,824,838 B2
(45) Date of Patent: Nov. 21, 2023

(54) PROVIDING ASSERTIONS REGARDING ENTITIES

(71) Applicant: Visa International Service Association, San Francisco, CA (US)

(72) Inventors: Michael Steven Bankston, Oakland, CA (US); Erik Christopher Friend, Mountain View, CA (US); Jerry Wald, San Francisco, CA (US); Victor Zhiltsov, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/709,287

(22) Filed: Mar. 30, 2022

(65) Prior Publication Data

US 2022/0303248 A1 Sep. 22, 2022

Related U.S. Application Data

(63) Continuation of application No. 16/193,848, filed on Nov. 16, 2018, now Pat. No. 11,323,420.

(Continued)

(51) Int. Cl.
*H04L 9/40* (2022.01)
*H04L 9/32* (2006.01)
*H04L 9/00* (2022.01)

(52) U.S. Cl.
CPC ........ *H04L 63/0421* (2013.01); *H04L 9/3239* (2013.01); *H04L 9/3247* (2013.01);
(Continued)

(58) Field of Classification Search
CPC . H04L 63/0421; H04L 9/3239; H04L 9/3247; H04L 9/3297; H04L 63/0428; H04L 63/061; H04L 9/50; H04L 2209/56
See application file for complete search history.

(56) References Cited

U.S. PATENT DOCUMENTS

2004/0185842 A1 9/2004 Spaur et al.
2010/0115598 A1 5/2010 Barriga et al.
(Continued)

FOREIGN PATENT DOCUMENTS

WO 2009/133419 A1 11/2009

OTHER PUBLICATIONS

Hardjono et al., "Trust: Data: A New Framework for Identity and Data Sharing", Visionary Future LLC., pp. 1-48.
(Continued)

*Primary Examiner* — Bruce S Ashley
(74) *Attorney, Agent, or Firm* — Kilpatrick Townsend & Stockton LLP

(57) ABSTRACT

Methods and systems disclosed herein relate to providing a receiving entity with a package of assertions. A package of assertions may include a group of yes or no statements (e.g., as an answer to a question). Alternatively, or additionally, a package of assertions may comprise a clustered assertion, which is a singular yes or no statement, that is itself based on a set of underlying assertions made using information from one or more sources. A particular type of package of assertions may be selected based on the relying entity requesting the assertions, based on an assertions model. The package of assertions may be cryptographically secured.

17 Claims, 15 Drawing Sheets

Related U.S. Application Data

(60) Provisional application No. 62/732,485, filed on Sep. 17, 2018, provisional application No. 62/732,488, filed on Sep. 17, 2018, provisional application No. 62/587,143, filed on Nov. 16, 2017.

(52) U.S. Cl.
CPC ........ *H04L 9/3297* (2013.01); *H04L 63/0428* (2013.01); *H04L 63/061* (2013.01); *H04L 9/50* (2022.05); *H04L 2209/56* (2013.01)

(56) References Cited

U.S. PATENT DOCUMENTS

| | | | |
|---|---|---|---|
| 2012/0191594 A1 | 7/2012 | Welch et al. | |
| 2012/0290482 A1* | 11/2012 | Atef | G10L 17/10 705/44 |
| 2013/0125197 A1 | 5/2013 | Pravetz et al. | |
| 2013/0125222 A1 | 5/2013 | Pravetz et al. | |
| 2016/0117349 A1 | 4/2016 | Segaran | |
| 2016/0210595 A1 | 7/2016 | Murphy | |
| 2016/0294879 A1 | 10/2016 | Kirsch | |
| 2017/0206603 A1 | 7/2017 | Al-masoud | |
| 2017/0250972 A1* | 8/2017 | Ronda | H04L 9/0891 |
| 2017/0364917 A1* | 12/2017 | Karantzis | G06Q 20/384 |
| 2018/0254907 A1 | 9/2018 | Gasparini | |

OTHER PUBLICATIONS

The Global Identity Foundation, "Global Identity—Challenges, pitfalls and solutions" Version 1, Oct. 2013, 25 pages.
OECD (2011), "National Strategies and Policies for Digital Identity Management in OECD Countries", OECD Digital Economy Papers, No. 177, OECD Publishing, Paris, 90 pages.
OECD, "Working Party on Security and Privacy in the Digital Economy," Developments in Digital Identity, 23 pages.
OECD, "Digital Identity Management—Enabling Innovation and Trust in the Internet Economy," 183 pages.
McWaters, Jesse et al., "A Blueprint for Digital Identity—The role of Financial Institutions in Building Digital Identity", World Economic Forum, Aug. 2016, 108 pages.
Schneider, Fredrich, "The Shadow Economy in Europe", AT Kearney, 20 pages.
"Identity Assurance Principles—Privacy and Consumer Advisory Group (PCAG)" V3.1, 12 pages.
TSYS, "2016 U.S. Consumer Payment Study", 36 pages.
"FAQs: Final CIP Rule", CIP-FAQ-RA2005-05Encl.pdf, 14 pages.
Souppaya, Murugiah et al., "Derived Personal Identity Verification (PIV) Credentials", National Institut of Standards and Technology, Jun. 18, 2015, 21 pages.
Tuefel III, Hugo, "Privacy Policy Guidance Memorandum", Memorandum No. 2008-01, U.S. Department of Homeland Security, 4 pages.
"National Strategy for Trusted Identities in Cyberspace—Enhancing Online Choice, Efficiency, Security, and Privacy", Apr. 2011, 52 pages.
Karadi, Gouthum, "The Distributed Internet: Blockchain Information Sharing and Privacy", BlockchainForPII.pdf, 12 pages.
Friese, Ingo, "Identity and Privacy Architecture Viewpoint for IoT systems", Version 1.0, 12 pages.
Unique Identification Authority of India, Government of India, "About Aadhaar", Nov. 26, 2018, uidai.gov.in/your-aadhaar/about-aadhaar.html, 1 page.
"Device Identity Management Needed Solutions for Device Identification", https://www.digicert.com/iot/device-identity-management.htm, 3 pages.
"Concepts of Identity within the Internet of Things", https://kantarainitiative.org/confluence/display/IDoT/Concepts+of+Identity+within+the+Internet+of+Things, 11 pages.

"Systems and software engineering—Architecture description", http://www.iso-architecture.org/ieee-1471/, Accessed Nov. 27, 2018, 8 pages.
"Gartner Says Managing Identities and Access Will Be Critical to the Success of the Internet of Things", http://www.gartner.com/newsroom/id/2985717, Feb. 17, 2015, 4 pages.
IoT Working Group, "Identity and Access Management for the Internet of Things—Summary Guidance", Cloud Security Alliance, 15 pages.
Yurcan, Brian, "Why banks should consider taking a page from Facebook on security keys", American Banker, published Jan. 26, 2017, https://www.americanbanker.com/news/why-banks-should-consider-taking-a-page-fromfacebook-on-security-keys, 4 pages.
Crosman, Penny, "Sorting out the authentication mess for omnichannel banking", American Banker, Published Jan. 12, 2017, https://www.americanbanker.com/news/sorting-out-the-authentication-mess-foromnichannel-Banking, 6 pages.
Hochstein, Marc, "Wells Fargo Fiasco Lays Bare a Broken Identity System", American Banker, published Oct. 20, 2016, https://www.americanbanker.com/opinion/wells-fargo-fiasco-lays-bare-a-broken-identitysystem, 4 pages.
Berry, Kate, "Calif. AG Investigates Wells Fargo for Criminal Identity Theft", American Banker, published Oct. 19, 2016, https://www.americanbanker.com/news/calif-ag-investigates-wells-fargo-for-criminal-identitytheft, 3 pages.
Crosman, published, "Which Identity Proof Works Best?", American Banker, Aug. 2, 2016, https://www.americanbanker.com/news/which-identity-proof-works-best, 6 pages.
Macheel, Tanaya, "Identity Startup Builds Trust Network to Devalue Stolen Data", American Banker, published Jul. 19, 2016, https://www.americanbanker.com/news/identity-startup-builds-trust-network-to-devaluestolen-data, 3 pages.
Macheel, Tanaya, "Santander Group Backs N.Y. Digital Identity Startup", American Banker, published on Jun. 22, 2016, https://www.americanbanker.com/news/santander-group-backs-ny-digital-identity-startup, 2 pages.
Crosman, Penny, "What Can Banks Offer in the Debate Over Digital Identity?", American Banker, published Jun. 21, 2016, https://www.americanbanker.com/news/what-can-banks-offer-in-the-debate-over-digitalidentity, 5 pages.
McKendry, Ian, "Small businesses need tougher cyber regs, CU executive says", American Banker, published Mar. 8, 2017, https://www.americanbanker.com/news/small-businesses-need-tougher-cyber-reqs-cuexecutive-says, 4 pages.
Crosman, Penny, "Identity Fraud: Back with a Vengeance, Harder to Stop", American Banker, published Jun. 9, 2016, https://www.americanbanker.com/news/identity-fraud-back-with-a-vengeance-harder-to-stop, 7 pages.
Yurcan, Bryan, "How BBVA is Tackling Digital Identity", American Banker, published Mar. 27, 2016, https://www.americanbanker.com/news/how-bbva-is-tackling-digital-identity, 3 pages.
Macheel, Tanaya, "Airbnb Hires a Blockchain Team in Possible Identity Play", American Banker, published Apr. 13, 2016, https://www.americanbanker.com/news/airbnb-hires-a-blockchain-team-in-possible-identityplay, 2 pages.
Adams, John, "Fed Addresses the Faster Payments Identity Crisis", American Banker, published Feb. 2, 2016, https://www.americanbanker.com/news/fed-addresses-the-faster-payments-identity-crisis, 4 pages.
Yurcan, Bryan, "How Blockchain Fits into the Future of Digital Identity", American Banker, published Apr. 8, 2016, https://www.americanbanker.com/news/how-blockchain-fits-into-the-future-of-digital-identity, 6 pages.
"Digital Identity Players to Watch", American Banker, published Mar. 27, 2016, https://www.americanbanker.com/slideshow/digital-identity-players-to-watch, 8 pages.
Yurcan, Bryan, "The Future of Digital Identity is Up to Banks", American Banker, published Mar. 27, 2016, https://www.americanbanker.com/news/the-future-of-digital-identity-is-up-to-banks, 11 pages.
Passy, Jacob, "Avoka, Trulioo Partner on Digital Identity Verification", American Banker, Published Nov. 3, 2015, https://www.americanbanker.com/news/avoka-trulioo-partner-on-digital-identity-verification, 1 page.

(56) References Cited

OTHER PUBLICATIONS

Waggoner, Darren, "Louisiana Man Allegedly Stole $5M, 300 Identities", American Banker, published Sep. 24, 2015, https://www.americanbanker.com/news/louisiana-man-allegedly-stole-5m-300-identities, 2 pages.

Crosman, Penny, "Identity is Broken—Can Banks Fix It?", American Banker, published Apr. 29, 2015, https://www.americanbanker.com/news/identity-is-broken-can-banks-fix-it, 7 pages.

International Search Report and Written Opinion, for PCT Application No. PCT/US2018/061600 dated Mar. 5, 2019, 9 pages.

* cited by examiner

For all Underlying Assertions in this set:

Assertion Model ID ::= This Model's index
Assertion Model Name ::= This Model's descriptor
Assertion Model Descriptor ::= This model's descriptive text
Assertion Model Date ::= Assertion Model
Assertion Trusted Authority ID ::= Trusted Entity signing this assertion (TAID)
Assertion Updater ID ::= Entity physically making this assertion (may be <> TAID)
Assertion Valid Sources ::= [list of valid assertion sources, e.g. ("Passport", Country of origin),
  ("Driver's License", Country, Province), ("Trusted Entity", Trusted Enitity eIDAS-compliant eSignatures), ....]

Assertion Scoring Link ::= Function URL for scoring assertions, e.g. NIST algorithm.

FIG. 10

For each Underlying Assertion:
{

Assertion Name ::= This assertion's descriptor
Assertion ID ::= 1-N
Assertion Type ::= [Binary, Link, Index]
Assertion Date Scope ::= "StartDate=DateTimeStamp", ["EndDate=DateTimeStamp", "EndDate=None", "HalfLife=DateTimeStamp"]
Assertion Value ::= This assertion's value, e.g. (Binary::={"Yes", "No"}), ("URL..." ::={}),... ("Distributed Ledger Link"::={}),...
Assertion Source ::= Assertion's source document [
Assertion Trust Score ::= (1,...,5)
Assertion Entity signature ::= Digital signature of the Entity of which this assertion is true
Assertion Trusted Authority ID ::= Digital signature of the Trusted Entity signing this assertion (TAID)
Assertion Updater ID ::= Digital signature of the Entity physically issuing this assertion, which might not equal the TAID
Assertion Model ID ::= Current Assertion model's index

For each Package of Assertions:
{

Package Name ::= This assertion's descriptor
Package ID ::= 1-N
Package Date Scope ::= "StartDate=DateTimeStamp",["EndDate=DateTimeStamp",
"EndDate=None", "HalfLife=DateTimeStamp"]
{
Assertion Name ::= This assertion's descriptor
Assertion Trust Score ::= (1,...,5)
},....
Assertion Model ID ::= Current Assertion model's index
}

FIG. 12

PROVIDING ASSERTIONS REGARDING ENTITIES

CROSS-REFERENCES TO RELATED APPLICATIONS

This application is a continuation of U.S. application Ser. No. 16/193,848, filed Nov. 16, 2018, which claims priority to U.S. Provisional Application No. 62/587,143, filed on Nov. 16, 2017; U.S. Provisional Application No. 62/732,485, filed on Sep. 17, 2018; and U.S. Provisional Application No. 62/732,488, filed on Sep. 17, 2018, the contents of which are incorporated by reference herein in their entirety.

BACKGROUND

A digital identity (DI) can include data associated with a set of information about an entity that can be shared with another entity. Currently, there are many (e.g., hundreds) of DI providers, including government entities and private enterprises. Each DI provider can use a different approach to create a DI, and there is no existing standard for creating a DI. For example, each DI provider can use different content and/or structure for its DIs as well as have different methods of accessing the DIs.

In order to make the information associated with a DI usable to a receiving entity, the information can be extracted from the data and provided to the receiving entity. For example, in an interaction between two entities, each entity can request that the other party provide information in a usable format. However, as the number of interacting entities increases, each DI can come from one of many potential sources. Integration between the different sources of DIs can create an N×N computing problem, where N is the number of sources of DIs. As such, the amount of integrations can grow exponentially with each new DI source.

For security reasons, it may be undesirable for the receiving entity to have access to the underlying assertions or information from the DI providers. To optimize privacy for the target entity, information should ideally be given out on a need-to-know basis. Thus, there exists a need for a receiving entity to be able to have a question answered to a desired degree of reliability and trustworthiness, without having direct access to the underlying information used in answering that question.

For the target entity for which data is being requested, high-friction experiences are common. For example, if a customer needs to prove her identity and income level, she may have to gather and validate several official documents. Not only is gathering this information inconvenient and error-prone, but it creates an unnecessary risk of identity fraud, as the customer is presenting private documents to the entities seeking information.

Embodiments of the disclosure address these and other problems individually and collectively.

BRIEF SUMMARY

Embodiments of the disclosure include methods as well as systems for providing assertions regarding entities that overcome some or all of the above-described deficiencies.

One embodiment of the disclosure is directed to a method comprising: receiving, from a relying entity, a request for one or more assertions for a target entity, wherein the request includes an identifier of the relying entity and an identifier of the target entity; identifying an assertions model based on the identifier of the relying entity, wherein the assertions model specifies a set of assertion types; determining a plurality of assertion values for the target entity; identifying a subset of the plurality of assertion values for the target entity, based on the set of assertion types specified by the assertions model; generating a package of assertions for the target entity, based on the subset of the plurality of assertion values for the target entity; and transmitting, to the relying entity, the package of assertions for the target entity.

Another embodiment of the disclosure is directed to a system comprising a server computer programmed to perform the above-noted method.

Another embodiment of the disclosure is directed to a method comprising: transmitting, by a relying entity, a request for one or more assertions for a target entity, wherein the request includes an identifier of the relying entity and an identifier of the target entity; and, responsive to the request, receiving, by the relying entity, a package of assertions for the target entity, wherein the package of assertions comprises a subset of a plurality of assertion values for the target entity, determined based on an assertions model corresponding to the identifier of the relying entity.

Further details regarding various embodiments can be found in the Detailed Description and the Figures.

BRIEF DESCRIPTION OF THE DRAWINGS

The example embodiment(s) of the present disclosure are illustrated by way of example, and not in way by limitation, in the figures of the accompanying drawings and in which like reference numerals refer to similar elements and in which:

FIGS. 10-12 are examples of information contained in a data package sent with a package of assertions, according to non-limiting embodiments.

Figure 1A:
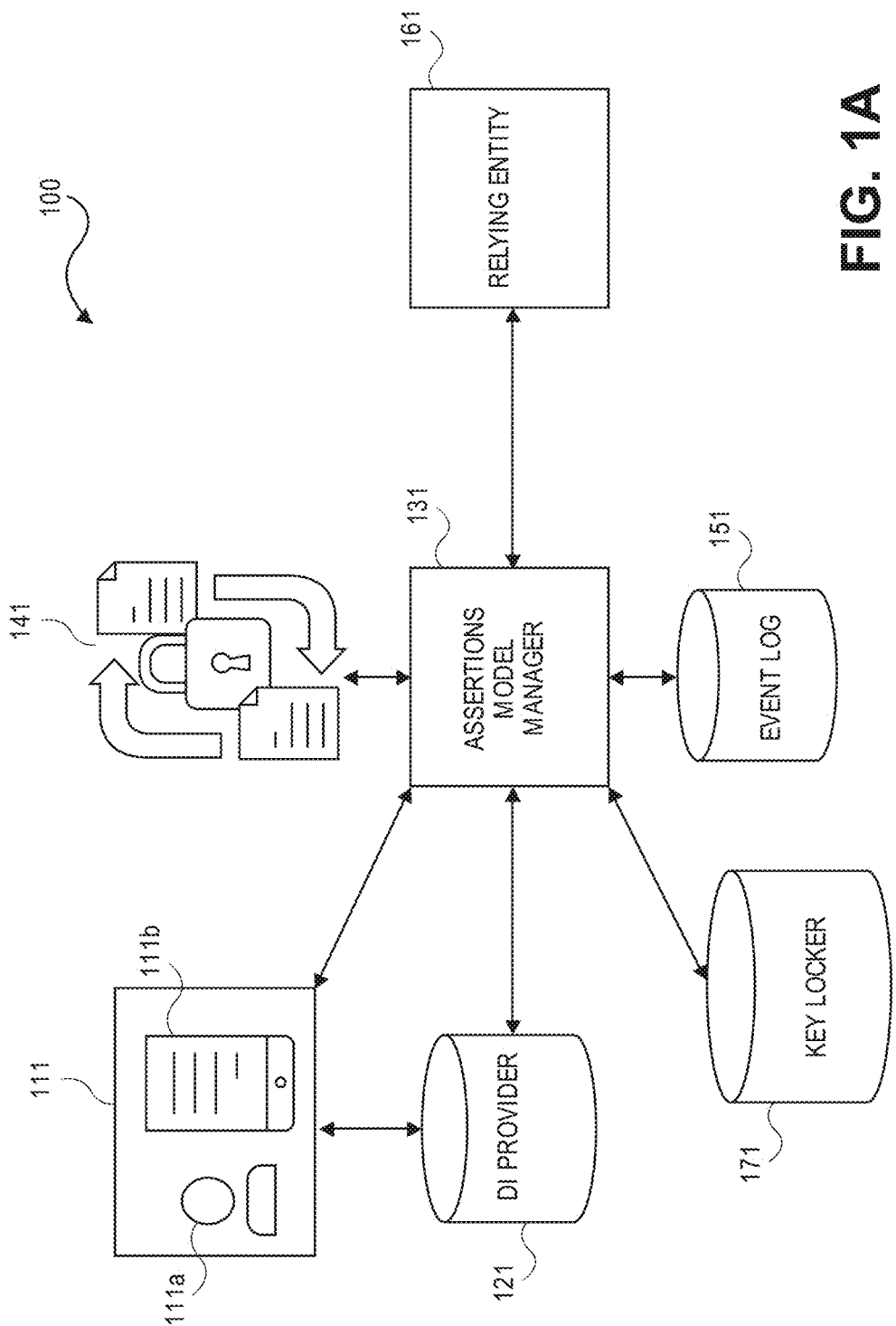
FIG. 1A is a schematic diagram of a system for providing at least one assertion according to a non-limiting embodiment.

While each of the figures illustrates a particular embodiment for purposes of illustrating a clear example, other embodiments may omit, add to, reorder, and/or modify any of the elements shown in the figures.

DETAILED DESCRIPTION OF THE INVENTION

Definitions

Prior to discussing various embodiments, some terms can be described in further detail.

The term "identifier" may refer to any information that may be used to identify information. In some embodiments, the identifier may be a special value generated randomly or according to a predetermined algorithm, code, or shared secret. For example, an individual may be identified using a driver's license number or a cryptographic key. In some embodiments, the identifier may be one or more graphics, a token, a bar code, a QR code, or any other information that may be used to uniquely identify an entity.

A "digital identity" (DI) may refer to a secure set of information about an entity (e.g., a person, organization, or thing). The DI may, in turn, be made available to another entity in a secure manner. DIs may rely on agreements among stakeholders and security measures such as cryptography.

An "assertion" may refer to a secure fact about an entity. For example, an assertion may specify something about an entity, such as whether the entity should be allowed to rent a car. An assertion may be secured cryptographically. An assertion may be digitally signed by the entity of interest and/or the trusted party providing the secure facts.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include a cryptographic key that that forms a public key of a public/private key pair. The public key may be designed to be shared (e.g., transmitted between entities) and may be configured such that any information encrypted with the public key may only be decrypted using a private key associated with the public key.

A "private key" may include a cryptographic key that forms a private key of a public/private key pair. A private key may be used to decrypt data encrypted with a public key.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

A "distributed ledger" may refer to a database that is shared among multiple nodes across a network. Entities corresponding to each node may store identical copies of the ledger at a given time. The entities may have permission to make changes or additions to the ledger. When the ledger is changed, the participating entities may receive the updated ledger. Examples of distributed ledgers include a blockchain, wherein transactions are verified before being encrypted and recorded to the ledger in a block of transactions.

The term "message" may include any data or information that may be transported from one entity to another entity (e.g., one computing device to another computing device). Messages may be communicated internally between devices/components within a computer or computing system or externally between devices over a communications network. Additionally, messages may be modified, altered, or otherwise changed to comprise encrypted or anonymized information.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer-readable medium that stores instructions that can be executed by a processor to implement a desired method. Examples of memories may comprise one or more memory chips, disk drives, etc. Such memories may operate using any suitable electrical, optical, and/or magnetic mode of operation.

As used herein, the terms "client" and "client device" may refer to one or more client-side devices or systems, remote from a transaction service provider, used to initiate or facilitate a transaction. As an example, a "client device" may refer to one or more POS devices and/or POS systems used by a merchant. It will be appreciated that a client device may be any electronic device configured to communicate with one or more networks and initiate or facilitate transactions such as, but not limited to, one or more computers, portable computers, tablet computers, cellular phones, wearable devices (e.g., watches, glasses, lenses, clothing, and/or the like), PDAs, and/or other like devices. Moreover, a "client" may also refer to an entity, such as a merchant, that owns, utilizes, and/or operates a client device for initiating transactions with a transaction service provider.

As used herein, the term "server" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

As used herein, the term "system" may refer to one or more computing devices or combinations of computing devices, such as but not limited to processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Systems

System Overview

Referring now to FIG. 1A, a schematic diagram of an example system 100 for providing at least one assertion is shown according to a non-limiting embodiment. System 100 illustrates only one of many possible arrangements of components configured to execute the programming described herein. Other arrangements may include fewer or different components, and the division of work between the components may vary depending on the arrangement.

The system 100 can include at least one digital identity (DI) provider 121, an assertions model manager 131, a relying entity 161, an event log 151, a ledger of assertions 141, a target entity 111, and a key locker 171. The components of the system 100 may all be in operative communication with each other through a communication network.

The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1A may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

In some embodiments, the target entity 111 is an entity for which one or more assertions are provided (i.e., the assertions are about the target entity 111). The target entity 111 may include a user 111A and/or a client device 111B of the target entity. As used herein, the term "target entity" may refer to an individual (e.g., a customer, a consumer, and/or the like), a business or other legal organization, a government agency, and/or the like. Additionally or alternatively, the term "target entity" may refer to a thing (e.g., an object, a piece of equipment, an electronic component, a computer system, and/or the like).

In some non-limiting embodiments, the target entity 111 may be assigned an identifier ("an identifier of the target entity"). The identifier of the target entity may include data associated with a digital signature and/or cryptographic key of the target entity 111. Alternatively, or additionally, the identifier of the target entity may include an ID number, a QR code, and/or the like.

Information about a target entity can be retrieved from sources. One type of source is a DI provider 121. A DI provider 121 manages one or more digital identities (DIs) associated with a target entity 111. As described above, a DI can include data associated with a set of information about an entity that can be shared with another entity. The DI provider 121 may be an issuer, an acquirer, a transaction service provider, a government agency, and/or the like. The DI provider 121 is configured to create and store DIs. In some embodiments, the DI provider 121 may generate assertions.

A DI provider 121 may retrieve data from another source. Such a primary source of information is referred to herein as a reference. References are generally trusted sources of information. A reference may be a verified document (e.g., a birth certificate, driver's license, password, credit card, etc.). Alternatively, or additionally, a reference may be an entity, such as a government agency, bank, individual, etc., that can provide trusted information. In some embodiments, the DI provider 121 may establish a DI based on information gathered from one or more references.

In some non-limiting embodiments, the DI provider 121 may be assigned an identifier ("an identifier of the DI provider"). The identifier of the DI provider may include data associated with a digital signature and/or cryptographic key of the DI provider 121.

In some non-limiting embodiments, the relying entity 161 is an entity to receive one or more assertions. The relying entity 161 can be any entity requesting information (e.g., assertions) about the target entity 111. For example, the relying entity 161 can be a merchant requesting information (e.g., assertions) about a target entity 111 initiating a payment transaction. Additionally or alternatively, the relying entity 161 can be an entity (e.g., a government agency or business organization) requesting information (e.g., assertions) about the target entity 111 with respect to a non-payment interaction (e.g., granting the target entity 111 access to a secured area or event venue).

In some non-limiting embodiments, the relying entity 161 may be assigned an identifier ("an identifier of the relying entity"). The identifier of the relying entity may include data associated with a digital signature and/or cryptographic key of the relying entity 161.

Figure 1B:
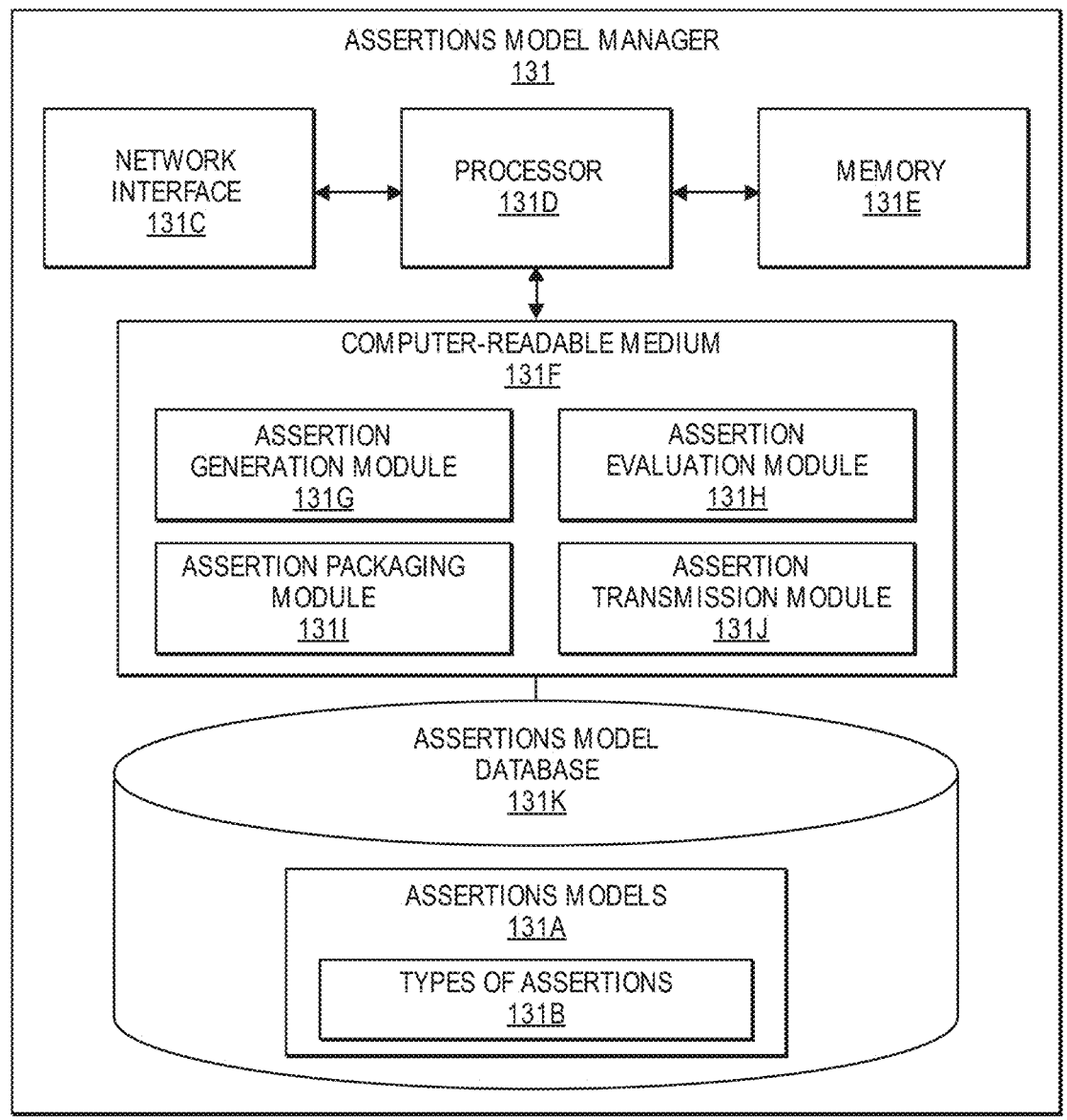
FIG. 1B is a schematic diagram of an assertions model manager according to a non-limiting embodiment.

Referring now to FIG. 1B, the assertions model manager 131 may include hardware and/or software configured to generate a package of assertions based on an assertions model 131A. The assertions model manager 131 may include a processor 131D operatively coupled to a network interface 131C, a memory 131E, and a computer-readable medium 131F. The assertions model manager 131 may further include an assertions model database 131K.

The assertions model database 131K may be a storage unit and/or device (e.g., a file system, database, collection of tables, or other storage mechanism) for storing data. The assertions model database 131K may include multiple different storage units and/or devices. The assertions model database 131K may store assertions models 131A and types of assertions 131B.

In some embodiments, an assertions model 131A specifies one or more types of assertions 131B. A type of assertion 131B may correspond to a particular question. The question may be of the type that can be answered with a true/false or yes/no statement. As an example, a type of assertion may correspond to whether a target entity is a United States citizen.

When an answer is provided corresponding to a type of assertion 131B and a particular target entity, e.g. "yes, Joe Smith is a United States citizen," this may be referred to as an "assertion value." The assertion value may be combined with supplemental data and/or formatted so as to generate an "assertion."

Figure 2A:
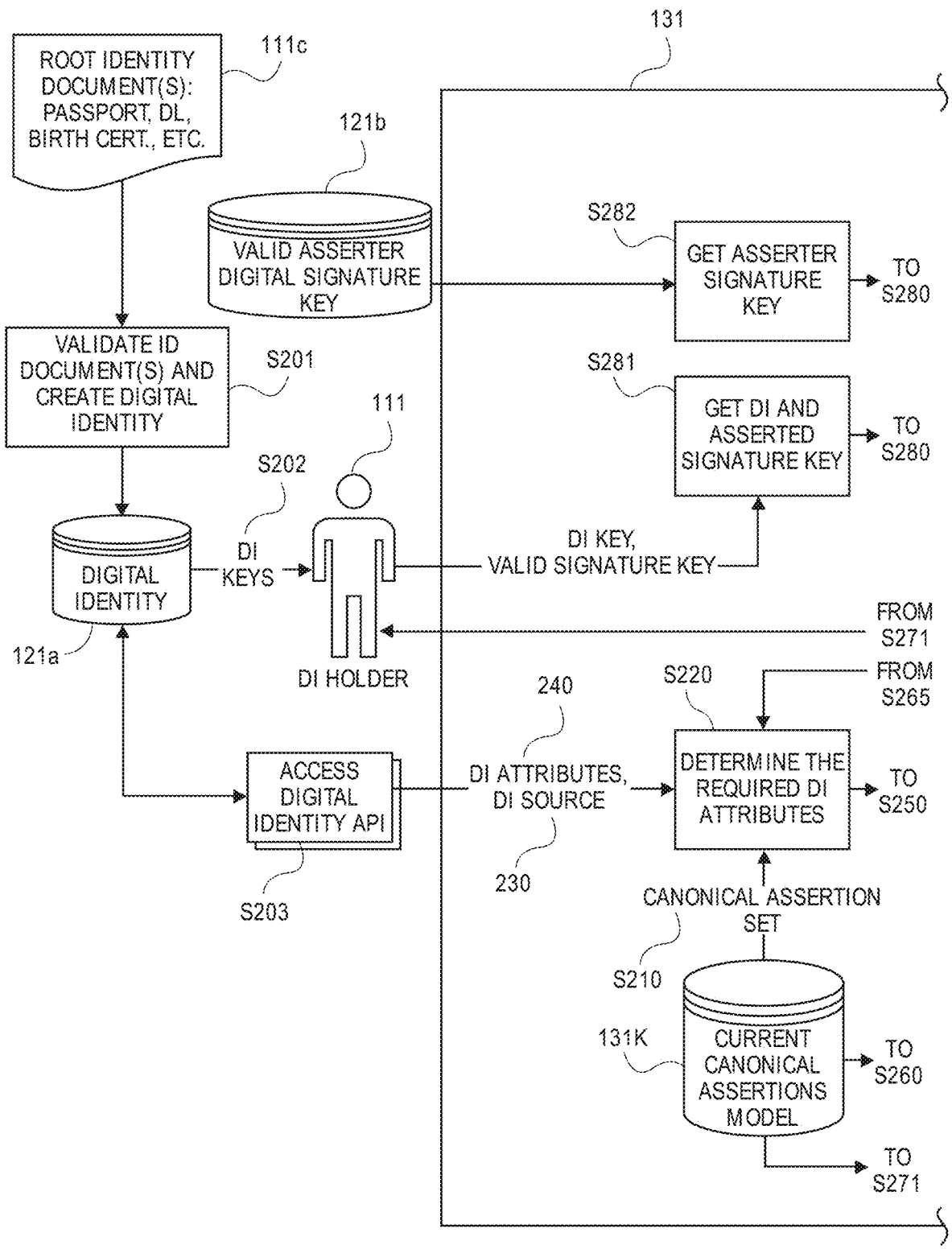
FIGS. 2A-2B are a schematic sequence diagram of a system for providing at least one assertion based on a digital identity (DI) according to a non-limiting embodiment.

In some embodiments, a type of assertion 131B corresponds to a type of identity attribute. A type of identity attribute may be any category of data stored, e.g., by a DI provider 121. Examples of types of identity attributes include a date of birth, place of birth, place of employment, etc. A type of assertion 131B may map to one or more types of identity attributes. As an example, the type of assertion "whether United States citizen" corresponds to the identity attribute "citizenship." As another example, the type of assertion "whether at least 21 years old" corresponds to the identity attribute "date of birth." Based on the identified type of identity attribute, the assertions model manager may locate corresponding identity attribute data 111C (e.g., from one or more DI providers 121, as shown in FIG. 2A).

An assertions model 131A may include several types of assertions 131B. For example, a particular assertions model 131A may include three types of assertions 131B—whether the target entity 111 is an employee of Widget Corp., whether the target entity 111 has a valid security clearance, and whether the target entity 111 is a United States Citizen.

In some embodiments, an assertions model 131A may include one or more types of identity attributes in addition to the types of assertions 131B. For example, a particular assertions model 131A may include: (1) whether the target entity is a resident of Texas (a type of assertion), (2) whether the target entity is at least 18 years of age (a type of assertion), (3) the target entity's name (a type of identity attribute), and (4) the target entity's address (a type of identity attribute). If the assertions model 131A is used to generate a package of assertions using actual identify attribute data, increased security measures may be implemented. For example, access to actual data may be restricted using a cryptographically secure link that goes out of scope after a certain amount of time or under certain conditions.

The assertions model 131A may specify additional information. The assertions model 131A may specify a name of the assertions model. The assertions model 131A may specify a context (e.g. social media or online banking). The assertions model 131A may specify an authentication method (e.g., an appropriate authentication method determined based on the type of relying entity, which may include credentials). The assertions model 131A may further specify a method of combining or rating the assertions, a name/identifier and current version number of the assertions model, and/or the date on which the assertions model was last updated.

An assertions model 131A may be tailored to one or more types of relying entities or domains (e.g., there may be an assertions model for ecommerce, an assertions model for government entities, an assertions model for bars, an assertions model for rental car companies, etc.). As an example, an assertions model for the type of relying entity "liquor store" may include two types of assertions 131B: (1) whether the target entity is 21 or older and (2) whether the target entity has access to at least $5 in a payment account. Alternatively, or additionally, an assertions model may be tailored to a specific relying entity (e.g. a particular store, the DMV, a particular restaurant, etc.). As an example, an assertions model 131A for Joe's Liquor may include two types of assertions 131B: (1) whether the target entity is 21 or older and (2) whether the target entity has at least $50 in a payment account. Additionally or alternatively, assertions models may vary according to the target entity 111 and/or DI provider 121.

In some embodiments, each assertions model 131A may map to a plurality of relying entities 161 and/or types of relying entities. The assertions model manager 131 may, for example, store such mappings to the assertions model database 131K.

In some embodiments, the assertions models 131A may be generated by the assertions model manager. For example, the assertions model manager may generate one or more assertions models corresponding to rental car companies, based on historical data specifying what information is needed by rental car companies. Alternatively, or additionally, the assertions model manager may obtain assertions models from, or in cooperation with, other entities in the system (e.g., the relying entity 161, the target entity 111, and/or the DI provider 121). As an example, the target entity, an individual, may submit information to an Application Programming Interface (API) exposed by the assertions model manager 131 specifying that the individual only wishes to allow liquor stores to obtain an assertion whether the individual is at least 21 years old.

The network interface 131C may be configured to connect to one or more communication networks to allow the assertions model manager 131 to communicate with other entities such as the DI provider 121, the relying entity 161, the target entity 111, etc. For example, communication with the assertions model manager 131 can be direct, indirect, and/or via an API.

The processor 131D may be implemented as one or more integrated circuits (e.g., one or more single core or multicore microprocessors and/or microcontrollers). The processor 131D may be used to control the operation of the assertions model manager 131. The processor 131D can execute a variety of programs in response to program code or computer-readable code stored in memory 131E. The processor 131D may include functionality to maintain multiple concurrently executing programs or processes.

The memory 131E may be implemented using any combination of any number of non-volatile memories (e.g., flash memory) and volatile memories (e.g., DRAM, SRAM), or any other non-transitory storage medium, or a combination of media.

The computer-readable medium 131F may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 208 may be any combination of such storage or transmission devices.

The computer-readable medium 131F may comprise software code stored as a series of instructions or commands The computer-readable medium 131F may comprise an assertion generation module 131G, an assertion evaluation module 131H, an assertion packaging module 131I, and an assertion transmission module 131J.

In some embodiments, the assertion generation module 131G includes software and/or hardware configured to generate assertions. The assertion generation module 131G may use an assertions model 131A, and/or information specified by the relying entity 161, to identify one or more types of identity attribute corresponding to a particular type of assertion. For example, the assertions model manager generates an assertion whether the target entity 111 is old enough to buy alcohol in the location of the relying entity 161. The assertion generation module 131G may determine, e.g., using a look-up table or mapping, that the corresponding types of identity attributes are the date of birth of the target entity 111 and the location of the relying entity 161. The assertion generation module 131G may retrieve the corresponding identity attribute data 111C from, e.g., one or more DI providers. The assertion generation module 131G may compute an assertion value, based on the retrieved identity attribute data.

The assertion evaluation module 131H includes software and/or hardware configured to evaluate assertions. The assertion evaluation module 131H may compute a strength score for an assertion. The assertion evaluation module 131H may initially assign strength scores to DI providers. A strength score may be assigned to a DI provider based on the DI provider's methods of validating the underlying identify attribute data and/or the reference source of the underlying identity attribute data. As an example, a social media provider may generate assertions based solely on only a validated email address. Accordingly, the social media provider is assigned a relatively "weak" score. On the other hand, a bank may generate assertions using identity attribute data confirmed using a state document like a driver's license, proof of address, background checks of the data against several different databases (e.g. credit history), and a bank clerk looking at the target entity to verify that the individual matches the presented driver's license picture. Accordingly, bank may be given a relatively "strong" strength score indicating confidence in the assertions from the DI provider. As a nonlimiting example, strength scores may be calculated for DI providers according to a model such as the NIST model. The NIST model technique is described in NIST Special Publication 800-63A, Digital Identity Guidelines: Enrollment and Identity Proofing Requirements, U.S. Department of Commerce (updated Nov. 15, 2017), available at https://doi.org/10.6028/NIST.SP.800-63a, which is hereby incorporated herein in its entirety.

The strength score of an assertion may, in turn, be directly based on the strength score of the DI provider that made that assertion. For example, a DI provider, Jones Bank may be assigned a strength score of 75. All assertions from Jones Bank may then be given a strength score of 75, based on the strength score of Jones Bank. Alternatively, or additionally, assertions from a given source may be assigned different strength scores. For example, Jones Bank may require four different references to validate a target entity's address, but only two different references to validate a target entity's age. Accordingly, assertions about the target entity's address may receive a higher strength score than assertions about the target entity's age.

The assertion evaluation module 131H may identify filter criteria for evaluating one or more assertions. The filter criteria may comprise a minimum acceptable strength score for one or more assertions. For example, the assertions model manager 131 may receive, from a relying entity 161, a request for a package of assertions including the criterion "only use data with a strength score greater than 80%." Alternatively, or additionally, the assertion evaluation module 131H may itself determine appropriate filter criteria for evaluating one or more assertions. For example, the assertions model manager may maintain a table of minimum acceptable strength scores corresponding to various types of relying entities 161, DI providers 121, and/or target entities 111 (e.g., 95% confidence required for border crossings; 30% confidence required for establishing a social media account, etc.).

In some embodiments, the assertion packaging module 131I includes software and/or hardware configured to generate a package of assertions. A package of assertions may correspond to a plurality of assertions grouped together in a targeted fashion (e.g., for a particular relying entity 161 or type of relying entity). A package of assertions may further include supporting data such as a strength score for the package of assertions and/or strength scores for the underlying assertions comprising the package of assertions. The assertion packaging module 131I may generate a package of assertions by collecting the necessary underlying assertions and/or supporting data. The assertion packaging module 131I may convert the assertions and/or supporting data into an appropriate format. The assertion packaging module 131I may further encrypt and/or digitally sign the package of assertions and/or underlying assertions.

In some embodiments, a package of assertions may be formatted as a "clustered" assertion, where a plurality of underlying assertions are used to generate a single assertion computed based on the underlying assertions. In this case, the assertion packaging module 131I may further compute the clustered assertion based on the underlying assertions.

In some embodiments, the assertion transmission module 131J may transmit packages of assertions and/or information about the packages of assertions. The assertion transmission module 131J may include one or more application programming interfaces (APIs) for sending/receiving data.

In some embodiments, the assertion transmission module 131J may transmit the package of assertions directly to the relying entity 161 (e.g., by a message). Alternatively, or additionally, the assertion transmission module 131J may write assertion data corresponding to the package of assertions to the ledger of assertions 141 and/or event log 151.

In some embodiments, the computer-readable medium 131F comprises code, executable by the processor 131D, to implement a method comprising: receiving, from a relying entity, a request for one or more assertions for a target entity, wherein the request includes an identifier of the relying entity and an identifier of the target entity; identifying an assertions model based on the identifier of the relying entity, wherein the assertions model specifies a set of assertion types; determining a plurality of assertion values for the target entity; identifying a subset of the plurality of assertion values for the target entity, based on the set of assertion types specified by the assertions model; generating a package of assertions for the target entity, based on the subset of the plurality of assertion values for the target entity; and transmitting, to the relying entity, the package of assertions for the target entity.

Returning to FIG. 1A, in some non-limiting embodiments, the assertions model manager 131 can include and/or be in communication with a ledger of assertions 141 and/or an event log 151.

The ledger of assertions 141 may be a file, a collection of files, or a database for storing assertions data. The ledger of assertions 141 may be a distributed ledger. The ledger of assertions, may for example, be implemented as an Ethereum blockchain, which is supported by the Ethereum Foundation (https://www.ethereum.org/). As another example, a Hyperledger may be used, which is an open-source Linux Foundation project (https://www.hyperledger-.org/). As another example, the ledger of assertions may be a permissioned ledger. A permissioned ledger is a ledger based on a permissioned blockchain model, wherein preapproved, well-defined entities may participate in a decentralized manner. Alternatively, or additionally, the assertions may be stored to a central database (e.g., maintained by the assertions model manager 131).

The ledger of assertions 141 may include a voting mechanism. For example, participants of the ledger of assertions 141, a distributed ledger, may vote on an assertion, package of assertions, and/or DI provider. The votes may be based on, e.g., whether an assertion was useful or valid. Assertions may be selected for future use or rejected based on a number of votes. The number of votes required may vary based on the strength score of a DI provider or assertion (e.g., the higher the strength score, the fewer votes required).

The event log 151 may be a file, a collection of files, or a database for storing event data. Each event may correspond to a request for information. For example, an event may correspond to a relying entity request for user data in association with a transaction. For a particular event, the system may store event data such as the parties involved, a type of the event, a timestamp, etc. Detailed examples of event data are described below with respect to FIG. 1C. Each event may be encrypted using a set of cryptographic keys. An event may, for example, be encrypted using the cryptographic key of the target entity 111, the cryptographic key of the DI provider 121, and/or the cryptographic key of the relying entity 161. The event may further be encrypted with cryptographic keys assigned to other entities, such as one or more third party facilitators or technology providers (e.g., financial transaction processors).

The event log 151 may be used to access event metadata for tasks such as dispute resolution, fraud detection, and/or analysis of user behaviors. By restricting access to the cryptographic keys needed to access one or more events, the event structure helps to keep data associated with a target entity private. For example, a private key held by a target entity may be required to access event data, ensuring that event data is only available with explicit permission from the target entity. Access paths to the event data may be defined via a common API structure. The access paths may be established such that limited entities may access the events with limited amounts of data.

The ledger of assertions 141 and the event log 151 each can be stored in any suitable computer-readable storage medium and/or any suitable combination of computer-readable storage media. For example, the ledger of assertions 141 and/or the event log 151 can be stored in a database. Additionally or alternatively, the ledger of assertions 141 and/or the event log 151 can be maintained and stored in a distributed ledger, including but not limited to a blockchain and/or the like. For purpose of illustration and not limitation, with reference to FIG. 1A, the ledger of assertions 141 is depicted as a distributed ledger and the event log 151 is depicted as a database.

The system 100 may further include a key locker 171. The key locker may be a be a file, a collection of files, or a database for storing cryptographic keys. The key locker 171 may be cloud-based. The key locker 171 may store cryptographic keys assigned to various entities (e.g., a cryptographic key assigned to a target entity 111, a DI provider 121, a relying entity 161, etc.). The key locker 171 may organize the keys based on target entity 111, such that the keys of parties that have been involved in events in association with a target entity 111 are stored in a structure based on that target entity 111. This set of keys may be encrypted using a key of the target entity 111, such that a private key held by the target entity 111 is required to release the set of keys. Alternatively, or additionally, a pairwise key set may be assigned for each relationship. As an example, a pairwise key set may be assigned for the target entity 111 and the relying entity 161.

In some embodiments, one or more of the keys may encoded based on the Base58 model. Base58 is a type of binary-to-text encoding using fifty-eight easily distinguished alphanumeric symbols and a payload of arbitrary size. Additionally, one or more keys may be encoded in Wallet Import Format (WIF). WIF is a method of encoding a key which facilitates copying the key and allows for compression. Some keys may or may not be encoded and/or encrypted based on the appropriate security level.

Event Structure

Figure 1C:
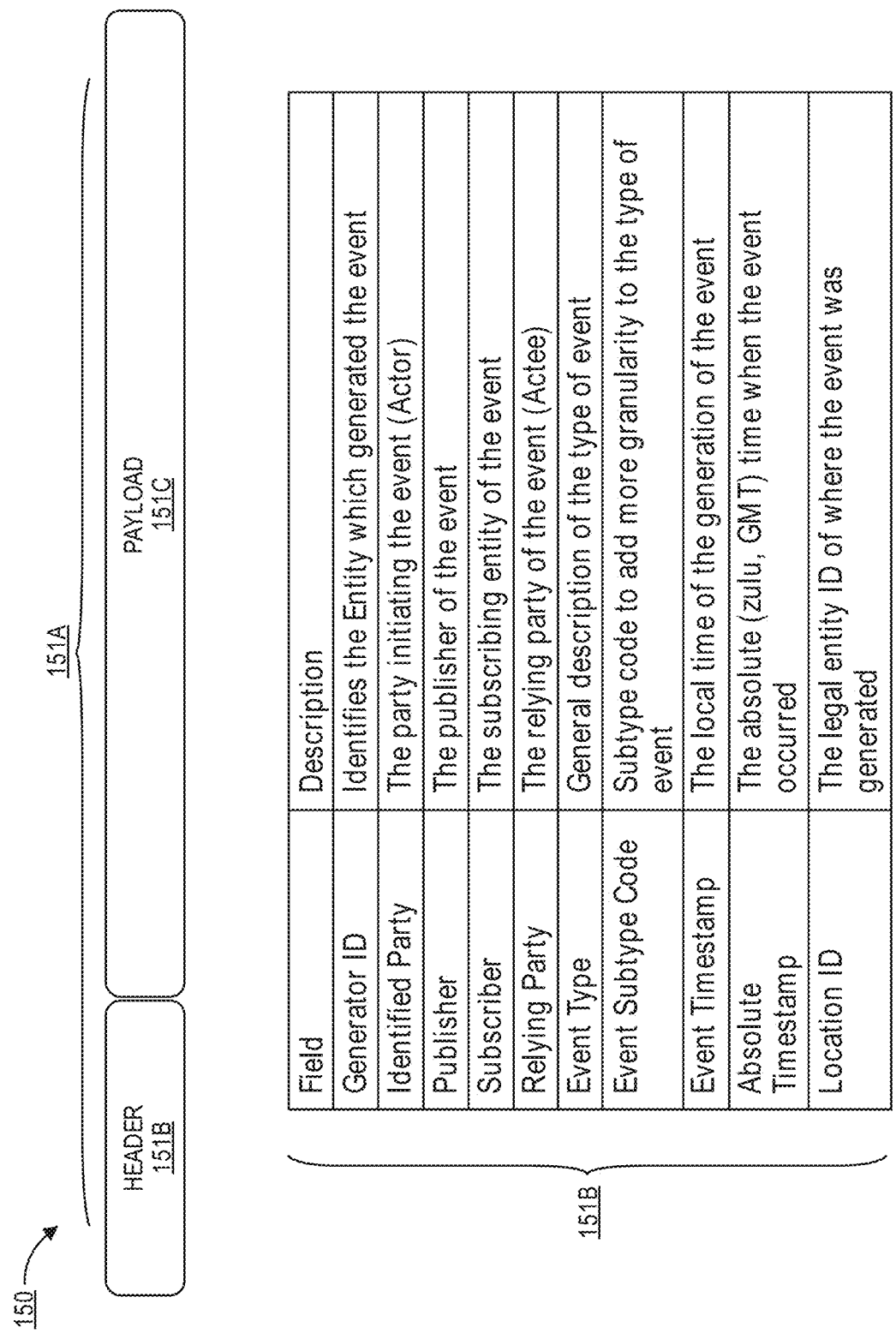
FIG. 1C illustrates an event structure according to a non-limiting embodiment.

FIG. 1C illustrates an example event structure 150. Each event may be stored to the event log 151 of FIG. 1A as an event object 151A. For example, an event object 151A may be a JavaScript Object Notation (JSON) object. Each event object 151A may include be a header 151B and a payload 151C.

The header 151B may contain a set of fields. As shown in FIG. 1C, the header 151B may include a field for a generator ID. The generator ID may identify an entity which generated the event. The header 151B may include a field for an identified party (e.g., the target entity 111). The header may include a field for a publisher of the event. For example, the assertions model manager 131 may publish an event to the event log upon providing an assertion. As another example, a relying entity 161 may publish an event to the event log, e.g., upon requesting an assertion. The header may include a field for a subscriber of the event. For example, parties such as relying entities, DI providers, or target entities may subscribe to receive notifications when the event log has been updated. The header may include a field for a relying party (e.g., the relying entity 161). The header may include fields for an event type and event subtype. The header may include fields for timestamps, such as an event timestamp and absolute timestamp. The header may include a field for a location ID, specifying a location where the event was generated.

The payload 151C may include additional data associated with the event. The payload may, for example, specify that an event has been initiated or completed. In some embodiments, the event may only include metadata about the event and not data about the target entity. The payload 151C may be stored to a multi-structured container.

One or more values in the event object may be encoded (e.g., Base58 encoded). As an example, some of the fields may be in Base58 WIF (e.g., the target entity, the relying entity, etc.). As a specific example, the fields Identified Party, Publisher, Subscriber, and Relying Party may be stored in Base58 WIF, while the other fields are alphanumeric or timestamps, as follows:

```
[
  {
    "Source ID": 3EC3165FAB81C43D32B4,
    "Identified Party": "0E329232EA6D0D73AF01",
    "Publisher": " 6C696E650D0ABD22",
    "Subscriber": "6F6F74686572F0112074",
    "Relying Party": "596F7572206C6970CFD6",
    "Event Type": "Age Confirmed",
    "Event Subtype Code": 10,
    "Event Timestamp": "2018-09-15 05:37:22.30 -8:00",
    "Absolute Timestamp": "2018-09-15 13:37:22.30 0:00",
    "Location ID": "CA014883"
  }
]
.
```

Methods

Providing Assertions Based on a DI

Figure 2B:
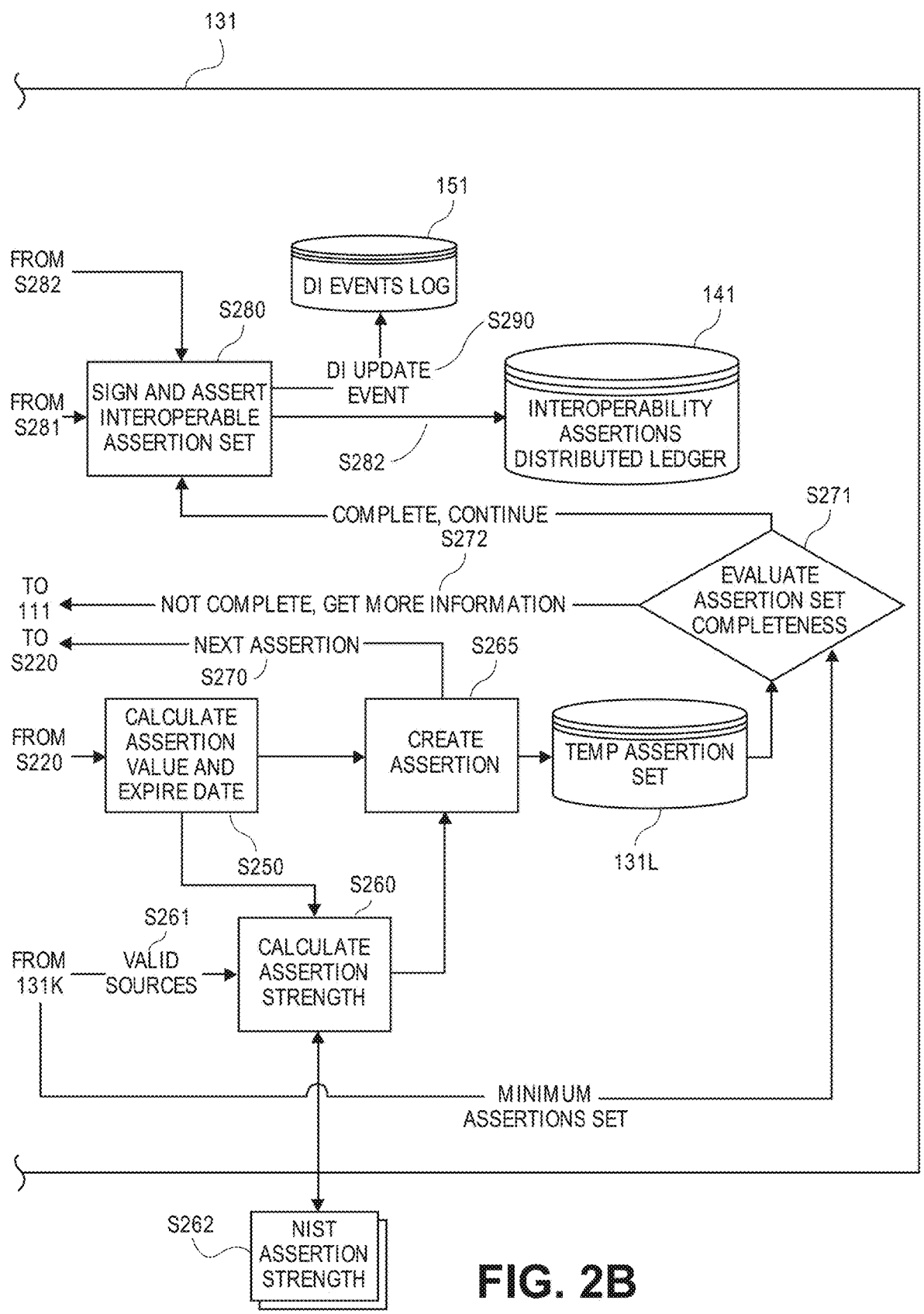

Referring now to FIGS. 2A-2B, a schematic sequence diagram of a system for providing assertions based on a DI is shown according to a non-limiting embodiment. To initiate creating a DI, the target entity 111 provides at least one reference of identity attribute data 111C to the DI provider 121. For example, as shown in FIG. 2A, the references 111C may include root identity documents such as a passport, a driver's license (DL), a birth certificate, etc.

At step S201, the DI provider 121 validates the reference(s) of identity attribute data 111C. As an example, the target entity may show a driver's license to the DI provider, a bank. The bank may swipe the driver's license to ensure the validity of the driver's license before accepting it as a valid source of information (e.g., date of birth, name, address, etc.).

If the reference(s) are valid, then the DI provider creates a DI for the target entity 111 to be stored in its DI database 121A. Additionally or alternatively, at step S202, the DI provider may provide a cryptographic key to the target entity 111 corresponding to the DI associated with the target entity 111.

At step S203, the DI provider 121 and/or the target entity 111 may communicate with the assertions model manager 131 via an API exposed by the assertions model manager 131. Via the API, the DI provider may transmit identity attribute data and/or assertions. As shown in FIG. 2A, the DI provider 121 transmits identity attribute data 240 (e.g., a target entity's date of birth or social security number) and information about the reference source of the identity attribute data 230 (e.g., a driver's license, a government entity, etc.) to the assertions model manager 131 via the API.

At step S210, the assertions model manager 131 may receive or retrieve an assertions model 131A (e.g., from the assertions model database 131K). Based on the assertions model, the assertions model manager 131 determines the required types of identity attributes specified by the assertions model. The assertions model manager 131 may determine one or more types of identity attributes corresponding to the type of assertion (e.g., date of birth is a type of identity attribute corresponding to the assertion AGE≥21). The assertions model manager 131 may further determine a reference source of identity attribute data corresponding to each respective type of identity attribute (e.g., a driver's license validated by a bank is the reference source of the target entity's date of birth).

At step S220, the assertions model manager 131 may obtain identity attribute data associated with the target entity corresponding to the type of identity attribute identified. For example, the assertions model manager 131 may retrieve the target entity's date of birth from the DI provider via the API.

At step S250, the assertions model manager 131 may calculate a value of an assertion corresponding to the type of assertion based on the identity attribute data associated with the entity. Calculating a value of an assertion based on obtained identity attribute data is described in detail below with respect to FIG. 4.

At step S261, the assertions model manager 131 may identify a list of valid sources (e.g., from the assertions model database 131K). At step S262, the assertions model manager may further identify a technique to calculate a strength score of each assertion.

At step S260, the assertions model manager 131 may calculate a strength score for each assertion, as described in detail below with respect to FIGS. 4, 6, and 7.

At step S265, the assertions model manager 131 may create an assertion, as described in detail below with respect to FIG. 4. The assertion may be temporarily stored in a temporary assertion set 131L.

At step S270, the assertions model manager 131 may determine whether there are remaining types of assertions in the assertions model. For example, if there are remaining types of assertions, the process for each type of assertion can be repeated starting at S220.

Additionally or alternatively, at step S271, the assertions model manager 131 may determine that the DI provider 121 does not have the identity attribute data necessary to create a particular assertion included in the assertions model. In this case, the assertions model manager and/or the DI provider may transmit a request to the target entity 111 to provide additional information required to complete creating the assertions.

At step S280, the assertions model manager 131 may sign and assert the set of assertions. For example, signing the set of assertions can include, at S281, obtaining the cryptographic key of the target entity 111 and/or obtaining the cryptographic key of the DI provider 121. At step S280, the assertions model manager 131 may use the cryptographic key(s) to sign and assert the set of assertions.

At step S282, the assertions model manager 131 may transmit the set of assertions. The assertions model manager may, for example to write the set of assertions to the ledger of assertions 141.

Additionally or alternatively, at step S290, the assertions model manager 131 may update the event log 151. Writing to the ledger of assertions and updating the event log are described in detail below with respect to FIG. 4.

Providing a Package of Assertions

Figure 3:
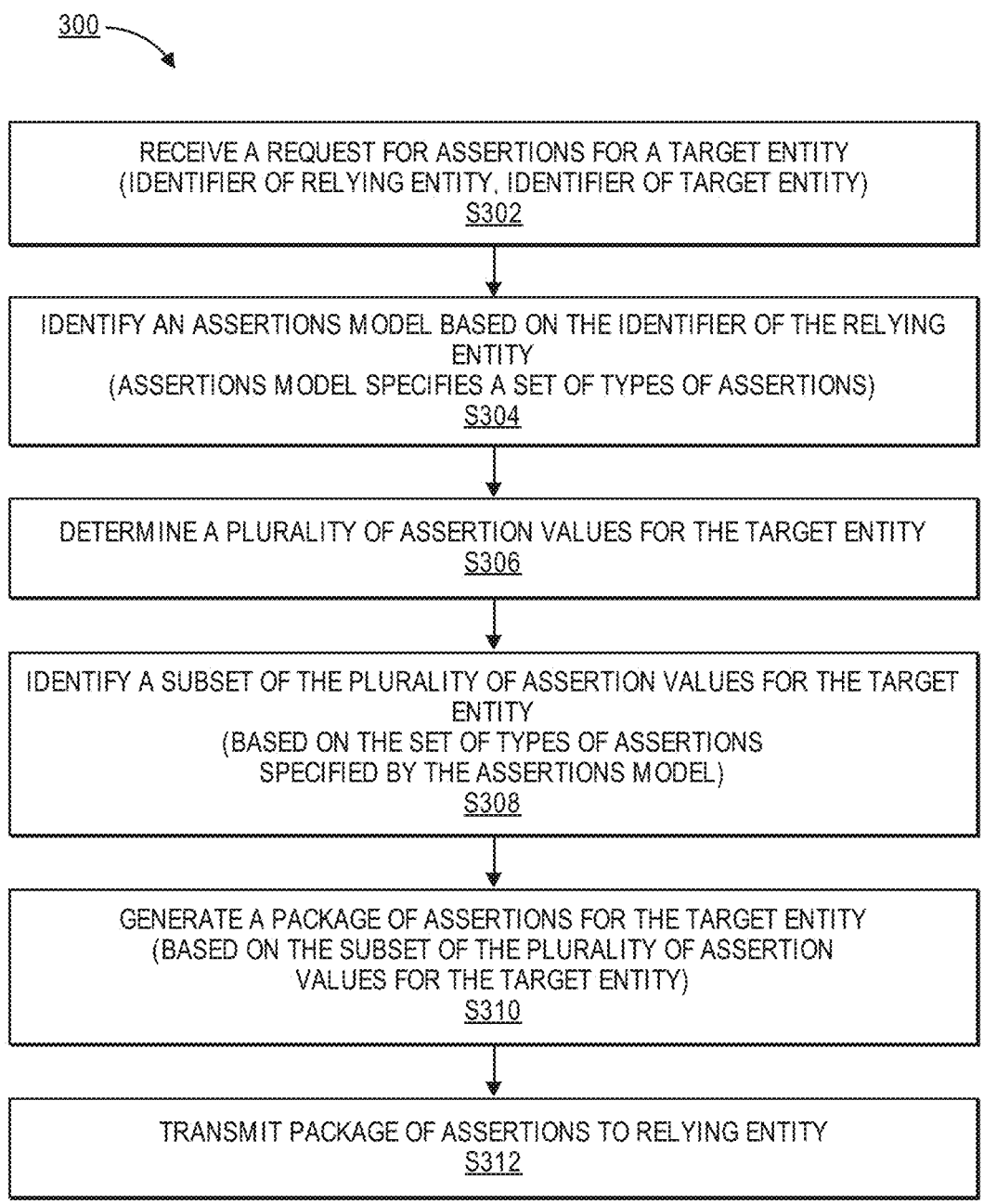
FIG. 3 is a flow diagram for a method of providing a package of assertions according to a non-limiting embodiment.

Referring now to FIG. 3, a flow diagram of a method 300 for providing a package of assertions is shown according to a non-limiting embodiment. FIG. 3 is best understood in the context of the example system 100 shown in FIGS. 1A-1B.

At step S302, the assertions model manager may receive, from a relying entity, a request for one or more assertions for a target entity. The request may include an identifier of the relying entity and an identifier of the target entity. The assertions model manager may receive the request from the relying entity via an API push and/or a received message.

The request may further include additional data. The request may include entity type data identifying a type of entity associated with the relying entity. For example, the entity type data may comprise a merchant category code (MCC) and/or the like. The request may include assertions request data associated with at least a subset of the type(s) of assertion(s) in an assertions model.

Additionally or alternatively, before communicating the request for assertions, the relying entity may present its identifier (e.g., the cryptographic key of the relying entity) and/or its entity type (e.g., an MCC) to the assertions model manager. The assertions model manager may communicate a set of assertions that the relying entity is permitted to request. For example, the relying entity may be entitled to a subset of potential assertions based on its entity type. Such a communication to determine the set of assertions the relying entity is permitted to request can also be logged in the event log (e.g., the assertions model manager may update the event log).

As an example, for the purpose of illustration and not limitation, the relying entity may be a car rental company. Based on the entity type, the relying entity can be permitted to request information specifying whether the target entity is old enough to rent a car, has a valid driver's license, has (a) valid payment token(s), and/or the like. As another example, for the purpose of illustration and not limitation, if the relying entity is a bar/restaurant, the relying entity can be permitted to request whether the target entity 111 is old enough to purchase alcohol, has (a) valid payment token(s), and/or the like.

The assertions model manager may refrain from generating the package of assertions if the relying entity requests assertions which the relying entity is not permitted to receive. For example, if the relying entity is a shoe store, the relying entity may not be permitted to receive assertions indicating the age of a target entity. The assertions model manager may refrain from performing operations 304-312 upon determining that the relying entity has requested unpermitted assertions.

At step S304, the assertions model manager may identify an assertions model based on the identifier of the relying entity. The assertions model manager may, for example, use a stored mapping to identify an assertions model which maps to the relying entity based on the cryptographic key assigned to the relying entity.

In some embodiments, the assertions model specifies a set of assertion types. As an example, the assertions model identified by the assertions model manager specifies three types of assertions: whether the target entity is an employee of Jones Co., whether the target entity is enrolled in company insurance, and whether the target entity has established a login for the insurance provider's website.

At step S306, the assertions model manager may determine a plurality of assertion values for the target entity. For each type of assertion in the assertions model, the assertions model manager may compute a corresponding assertion value, as described in detail below with respect to FIG. 4.

Alternatively, or additionally, the assertions model manager may retrieve a plurality of stored assertion values. As an example, after computing an assertions value, the assertions model manager may store the assertions value to the ledger of assertions. The assertions model manager may then retrieve the plurality of assertion values from the ledger of assertions. In some embodiments, the assertions model manager may identify assertions generated by another entity. For example, the assertions model manager may retrieve, from, a DI provider, an assertion generated by the DI provider.

At step S308, the assertions model manager may identify a subset of the plurality of assertion values for the target entity. The assertions model manager may identify the subset of the plurality of assertion values for the target entity based on the set of types of assertions specified by the assertions model.

In some embodiments, if the plurality of assertion values have previously been determined, the assertions model manager may filter the plurality of assertion values based on the types of assertions values specified by the assertions model. As an example, the assertions model manager identifies, in the ledger of assertions, 100 assertion values previously determined for target entity John Doe. The identified assertions model includes five of the 100 types of assertions corresponding to the 100 assertion values. Accordingly, the assertions model manager selects the five assertions values, corresponding to the five types of assertions specified by the assertions model.

Alternatively, or additionally, the assertions model manager may identify the subset of the plurality of assertion values for the target entity by determining one or more of the assertion values in real-time, as described below with respect to FIG. 4.

At step S310, the assertions model manager may generate a package of assertions for the target entity. The assertions model manager may generate the package of assertions based on the subset of the plurality of assertion values for the target entity. For example, the assertions model manager may combine seven identified assertions into a data packet. Thus, the package of assertions may include two or more distinct assertion values for the target entity. The data packet may include additional data, as described below with respect to FIGS. 10-12.

The package of assertions may include a set of assertions selected for the relying entity. Alternatively, or additionally, the package of assertions may be or include a clustered assertion (i.e., a single yes/no answer generated based on multiple underlying assertions, as described below with respect to FIG. 7). In some embodiments, the package of assertions may be customized based on filter criteria, as described below with respect to FIG. 6.

At step S312, the assertions model manager may transmit the package of assertions to the relying entity. The assertions model manager may transmit the package of assertions via an API exposed to the relying entity and/or as a message to the relying entity. Alternatively, or additionally, the assertions model manager may transmit the package of assertions to the relying entity using a ledger of assertions and/or event log, as described in detail below with respect to FIG. 4.

Determining Assertion Values

Figure 4:
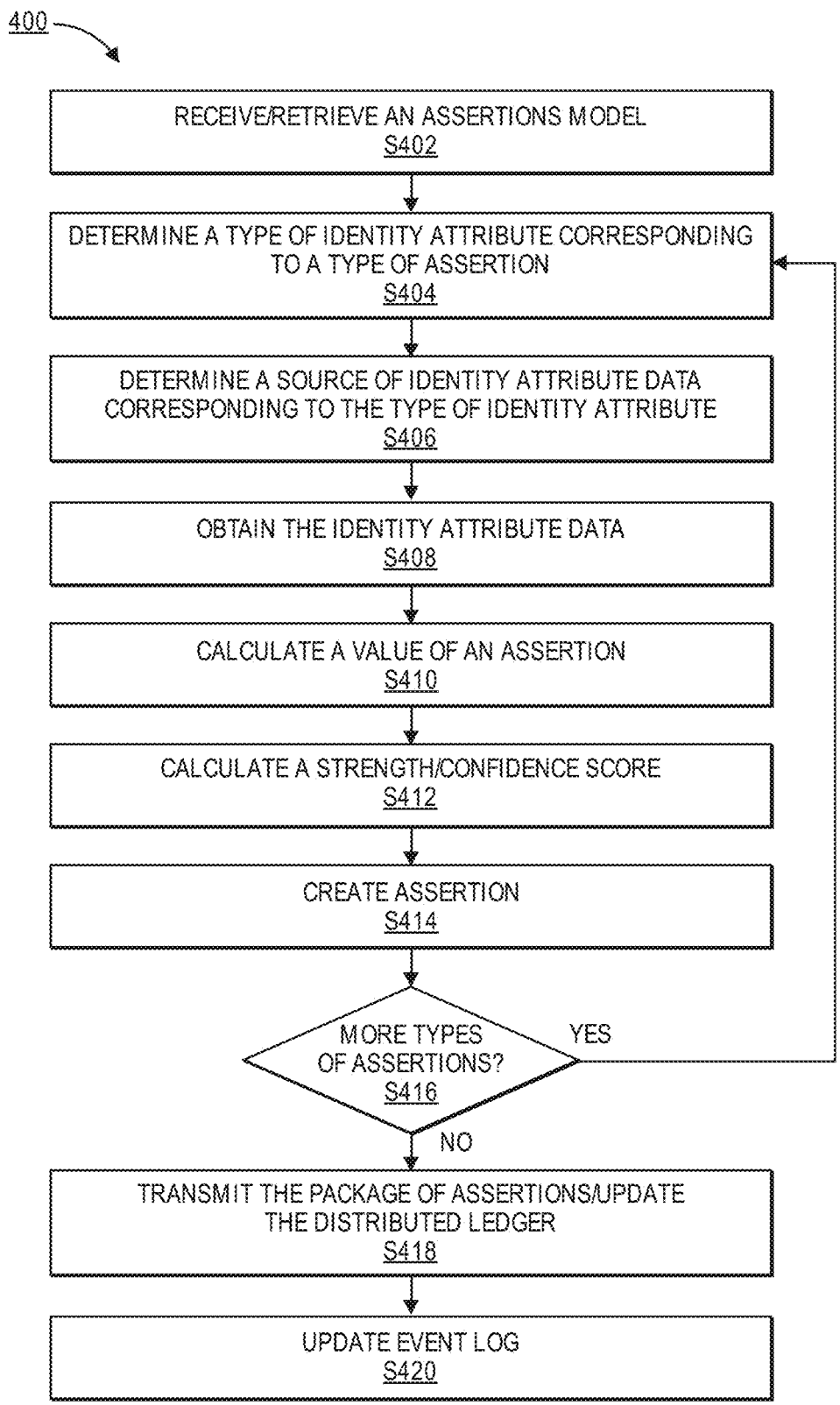
FIG. 4 is a flow diagram for a method of determining assertion values for inclusion in a package of assertions according to a non-limiting embodiment.

Referring now to FIG. 4, a flow diagram of a method 400 for determining assertion values for inclusion in a package of assertions is shown according to a non-limiting embodiment. FIG. 4 is best understood in the context of the example system 100 shown in FIGS. 1A-1B.

At step S402, the assertions model manager may receive or retrieve an assertions model. For example, the assertions model manager may retrieve data associated with the assertions model from the ledger of assertions. Additionally or alternatively, the assertions model manager may retrieve the data associated with the assertions model over a network from an external data storage, including but not limited to a database, a distributed ledger, a blockchain, and/or the like.

After step S402, the assertions model manager may identify a set of types of assertions corresponding to the assertions model. For example, the assertions model manager may determine that the assertions model includes three types of assertions: whether the target entity is at least 18 years of age, whether the target entity has a valid driver's license, and whether the target entity has a valid payment instrument. The assertions model manager may identify the types of assertions by analyzing the assertions model.

At step S404, the assertions model manager may determine a type of identity attribute corresponding to a type of assertion. The assertions model manager may use the assertions model to determine a type of identity attribute corresponding to each type of assertion of the assertions model. Each type of assertion of the assertions model may map to one or more respective types of identity attributes. For example, one type of assertion in the assertions model is whether the target entity is old enough to rent an automobile in the country in which the relying entity is located. This type of assertion maps to two types of identity attributes available from the DI providers: a date of birth of the target entity, and the country in which the relying entity is located.

At step S406, the assertions model manager determines one or more sources of identity attribute data corresponding to the type of identity attribute (e.g., DI providers and/or references from which the identify attribute data may be obtained). For example, the assertions model may include a list of valid sources of information for the types of assertions contained therein. As another example, a list of valid sources associated with one or more assertions models can be maintained and stored by the assertions model manager.

As a nonlimiting example, the type of assertion is whether a target entity is old enough to rent an automobile. The type of identity attribute of interest is the date of birth of the target entity. A list of valid sources of date of birth information can include government documents (e.g., a driver's license, birth certificate, passport, and/or the like), a government database, business organization records (e.g., of an issuer, a transaction service provider, and/or the like), and/or the like.

Additionally or alternatively, the assertions model manager may identify a verification method for verifying the type of identity attribute. As examples, the verification method may include inspection of documentation by the DI provider, verification by a business organization (e.g., a third-party service), and/or verification by a government agency. The assertions model manager may, for example, identify verifications stored in association with the respective types of identity attributes.

At step S408, the assertions model manager may obtain the identity attribute data. The assertions model manager may communicate with a DI provider to obtain the identity attribute data associated with the target entity corresponding to the type of identity attribute in the assertions model. The assertions model manager may receive the identity attribute data, for example, via an API exposed to the DI provider. The assertions model manager may further retrieve, from one or more DI providers, information about the reference from which the data was obtained. Alternatively, or additionally, data may be obtained from a reference (i.e., without a DI provider). The assertions model manager may, for example, access a government database storing data regarding the ownership of plots of land).

As a nonlimiting example, the assertions model manager is generating an assertion: whether a target entity is old enough to rent an automobile. The type of identity attribute of interest is the date of birth of the target entity. The identity attribute data associated with the date of birth may be a numerical representation of the date of birth of the target entity, a bit or bit string indicating whether the entity is above a certain age threshold (e.g., the minimum age to rent an automobile) or in a certain age category (e.g., under 18, between 18 and 25, over 25), and/or the like. Additionally, the identity attribute data may include the source of the date of birth data (e.g., visual inspection of a driver's license by the DI provider).

At step S410, the assertions model manager may calculate a value of the assertion. The assertions model manager may, for example, use an equation or algorithm stored in association with the assertions model to compute a value of the assertion based on the identity attribute data.

Continuing with the above example, the type of assertion is whether a target entity is old enough to rent an automobile. The type of identity attribute of interest is the date of birth of the target entity. An assertion value specifying whether the target entity is old enough to rent an automobile can be calculated based on the date of birth information provided by the DI provider using the following algorithm:

{"OfAgeToRentAutoInUSA"::="Yes" iff "Current date"−"Verified date of birth"≥25 years else "No"} where "OfAgeToRentAutoInUSA" is the assertion value specifying whether the target entity is old enough to rent an automobile in the USA, "Yes" is the value if the target entity is old enough, "No" is the value if the target entity 111 is not old enough, "Current date" is the date on which the calculation is made, and "Verified date of birth" is the date of birth of the target entity 111 as provided by the DI provider 121 after verification of the source of that data.

At step S412, the assertions model manager may calculate a strength score associated with the value of the assertion. The strength score of the assertion may directly map to a strength score of the DI provider from which the assertion or underlying identity attribute data was obtained. Alternatively, or additionally, the strength score may be based on additional criteria. For example, an assertion related to income may require more supporting data, to receive a comparable strength score, as compared to an assertion related to height.

As a nonlimiting example, the strength score may be calculated based on the DI provider's verification process as follows:

Strength Score (DI Provider)=$S_{ref}+S_{ver}+S_{link}/2$ $S_{ref}$ is a strength score of the references used (e.g., a driver's license, utility bill, passport, etc. may each be given a score). $S_{ver}$ is a score based on how the DI provider validates the references (e.g., the score may increase if a DI provider confirms a first reference using a second reference). $S_{link}$ is a score based on how the DI provider links the reference to the entity (e.g., the link score may be incremented if the DI provider visually inspects an individual to confirm she is the individual pictured in a photo ID). The result, a strength score of the DI provider, may be attached to every assertion made by the DI provider. As another nonlimiting example, the strength score may be calculated based on a model such as a NIST model, as described above with respect to FIG. 1B.

At step S414, the assertions model manager may create the assertion. Each assertion can include the value of the assertion and/or additional data. For example, an assertion may include a name of the assertion, a strength score of the assertion, an expiration date of the assertion, etc. Examples of various types of data which may be included in an assertion is illustrated in FIGS. 10-11.

Creating the assertion may comprise calculating and including an expiration date of the assertion. For example, the assertion may expire after a particular amount of time elapses (e.g. the assertion should be recomputed biannually), when the source of the information expires (e.g. a driver's license). If the assertion will not expire, then the expiration date can be omitted or the expiration data can have a value of null, "none," 0, and/or the like.

In some embodiments, the assertions model manager may store the generated assertion to a temporary set of assertions. Assertions may be temporarily stored to a temporary set of assertions until the full set of assertions corresponding to the assertions model is completed.

At step S416, the assertions model manager may determine whether there are remaining types of assertions in the assertions model for which an assertion has not yet been created. If there is at least one remaining type of assertion in the assertions model for which an assertion has not yet been created, then the next type of assertion can be selected and the process can be repeated (i.e., repeat steps S404-S416 until assertions corresponding to each type of assertion in the assertions model have been created).

After repeating steps S404-S416 one or more times, the assertions model manager may combine the assertions into a package of assertions. The assertions model manager may combine the assertions into a data packet. The assertions model manager may generate additional data and add the additional data to the data packet to form the package of assertions, as described below with respect to FIGS. 10-12.

At step S418, the assertions model manager may transmit the package of assertions. The package of assertions may include a value of each assertion, corresponding to each type of assertion of the assertions model, and/or additional data about the assertion(s). The assertions model manager may transmit the set of assertions to the relying entity (e.g., via a message and/or API push). The assertions model manager may encrypt and/or digitally sign the package of assertions prior to transmission.

Additionally or alternatively, the assertions model manager may transmit the assertions by updating the ledger of assertions. The assertions model manager may write the assertions data associated with the set of assertions to the ledger of assertions. The assertions model manager may cluster the assertions data under an index of data corresponding to the target entity. The index may be encrypted using a public key assigned to the target entity. A private key assigned to the target entity may be required to access any assertions data associated with the target entity.

At step S420, the assertions model manager may update the event log. The assertions model manager may generate an event, associated with the transmission of the set of assertions in the event log. The assertions model manager may store additional data associated with the event in the event log such as event type, event value, etc., as described above with respect to FIG. 1C. The assertions model manager may encrypt each event using multiple public keys assigned to multiple entities. For example, the event may be associated with the target entity, the requesting entity, two DI providers, and two processors. Each of these entities may be assigned a public key, which is used to encrypt the event.

Providing at Least One Assertion

Figure 5:
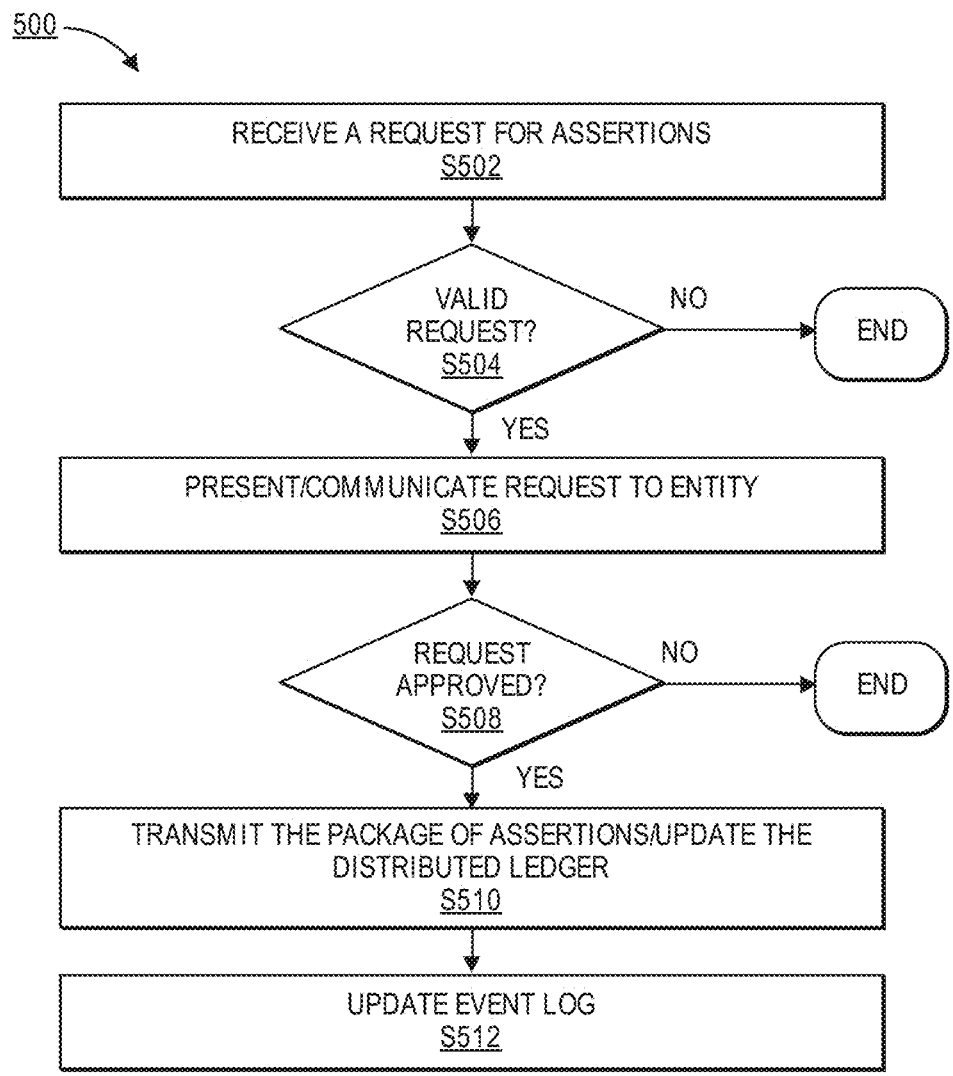
FIG. 5 is a flow diagram for a method of providing at least one assertion according to a non-limiting embodiment.

Referring now to FIG. 5, a flow diagram of a method 500 for providing at least one assertion is shown according to a non-limiting embodiment. FIG. 5 is best understood in the context of the example system 100 shown in FIGS. 1A-1B.

At S502, a request for assertions can be received. Receiving the request for assertions may be substantially similar to step S302, described above with respect to FIG. 3.

At step S504, the assertions model manager may determine whether the request for assertions is valid. For example, a relying entity of type "Bar" may request a package of assertions specifying whether a target entity has a mortgage. The assertions model manager may use the identifier of the relying entity to determine that the relying entity is not of a type privy to this information. The assertions model manager may validate any data received in the request, such as the identifier of the relying entity, entity type data identifying the type of entity associated with the relying entity, and/or the identifier of the target entity. For purposes of illustration and not limitation, the assertions model manager may confirm that the entity type matches a predetermined entity type associated with the identifier of the relying entity. Additionally or alternatively, the assertions model manager may determine a strength/confidence score associated with the identifier of the relying entity.

In some embodiments, if the assertions model manager determines that the request is not valid, then the process may end. Additionally or alternatively, the assertions model manager may transmit a notification to the relying entity 161 including information regarding why the request is invalid.

At step S506, if the request from the relying entity is valid, then the assertions model manager may transmit a notification to the target entity. In some non-limiting embodiments, the notification can include data identifying the relying entity, the entity type of the relying entity, the subset of the type(s) of assertion(s) requested, the strength/confidence score associated with the relying entity, or the like. The assertions model manager may further request approval from the target entity. For example, the target entity may be prompted to click a "yes" or "no" button indicating that the request is, or is not, approved by the target entity.

At step S508, the assertions model manager may determine whether the request is approved by the target entity. In some non-limiting embodiments, the assertions model manager may request and receive a confirmation from the target entity that the assertions model manager is approved to transmit response data associated with the package of assertions to the relying entity as requested. Alternatively, or additionally, the assertions model manager may determine whether the request is approved based on permission to share the data.

At step S508, the assertions model manager may transmit the package of assertions and/or update the distributed ledger. The assertions model manager may transmit the assertions data in a substantially similar fashion as described above with respect to FIGS. 3 and 4.

At step S512, the assertions model manager may update the event log. The assertions model manager may update the event log in a substantially similar fashion as described above with respect to FIG. 4.

Upon receiving the package of assertions, the relying entity may determine, based on the package of assertions, whether to proceed with an interaction. As examples, the relying entity may use the package of assertions to determine whether to proceed with a payment transaction or granting access to a location.

Providing a Custom Assertion

Figure 6:
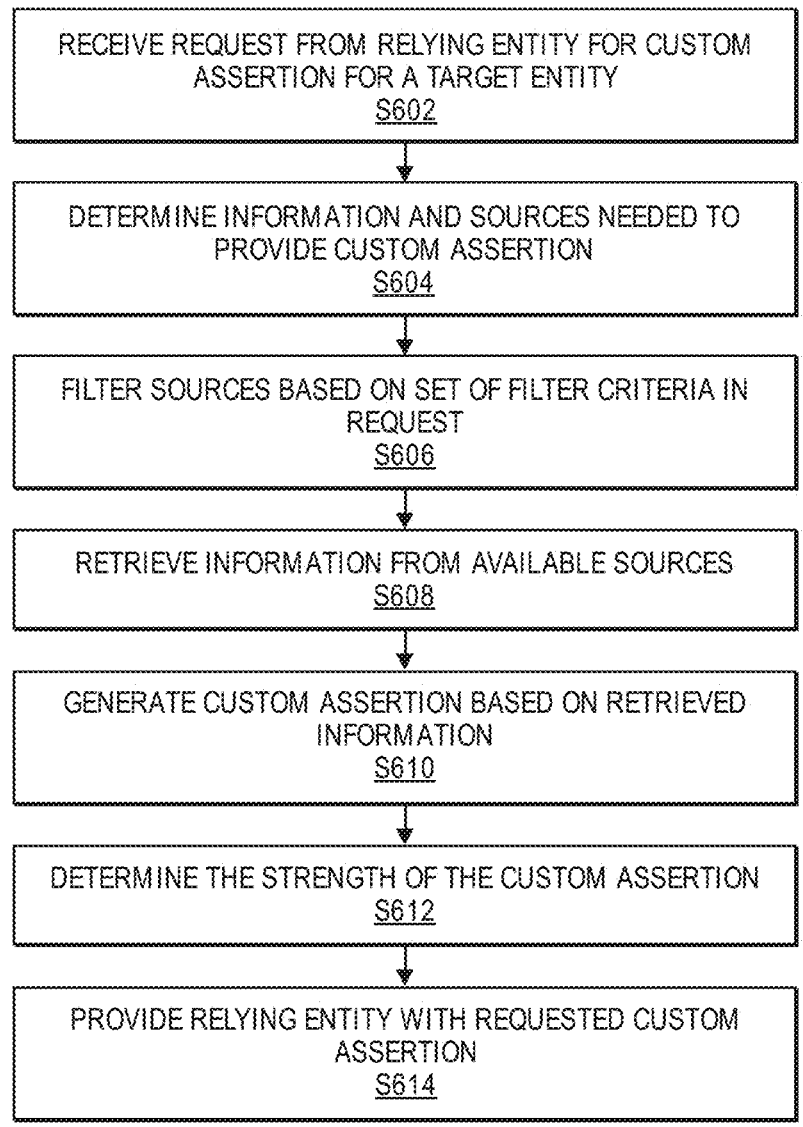
FIG. 6 is a flow diagram for a method of providing a custom assertion, according to a non-limiting embodiment.

FIG. 6 is a flow diagram for a method of providing a custom assertion, according to a non-limiting embodiment. FIG. 6 is best understood in the context of the example system 100 shown in FIGS. 1A-1B.

FIG. 6 illustrates operations for providing custom assertion or a custom package of assertions. The custom assertion(s) may require multiple sources of information (e.g., more than one DI provider and/or reference). For example, the relying entity may request an assertion made using data from multiple sources. Making an assertion using data from multiple sources may make the assertion more reliable by increasing the likelihood that the assertion is accurate. As another example, not all of the underlying information used to make the assertion(s) may reside with a single entity (e.g., it may be held across multiple DI providers and/or references). This may be the case when not all of the identity attribute data associated with the target entity are in possession of a singular source. Thus, a custom assertion may involve multiple sources providing multiple, independent assertions for improved redundancy/reliability. Alternatively, or additionally, a custom assertion may involve multiple sources providing the information or identity attribute(s) necessary to generate the custom assertion. There may not be a limit on the number of sources involved. For example, the assertions model manager may be tasked with generating a custom assertion that is based on information from ten or more sources.

At step S602, the assertions model manager may receive a request, from a relying entity, for a custom assertion associated with a particular target entity. The request may include an identifier of the relying entity, which can be used to help determine the proper assertions model to use (e.g., if the custom assertion has already been pre-defined in an assertions model). The request may also include an identifier associated with the target entity, which can be used to acquire the information required to generate a custom assertion for the particular target entity. In some embodiments, the request may also specify a particular custom assertion or an identifier for a custom assertion that the relying entity wishes to receive.

In some embodiments, the request may also specify a set of criteria ("filer criteria") which the custom assertion must meet, such as a minimum rating or score associated with the custom assertion or any of the sources used to make the custom assertion. For example, the requesting relying entity may set a minimum strength score for the sources used to obtain data. Based on the filter criteria transmitted in the request specifying the minimum strength score, only sources that meet that minimum strength score are selected. By establishing filter criteria, the relying entity may receive a custom assertion that is generated based on information from sources that meet a specified criteria for reliability.

In some embodiments, there may be limitations with regards to the custom assertion(s) that can be provided (e.g., in order to comply with regulations or business rules). For instance, the assertions model manager may impose restrictions on the ability of a relying entity to obtain an assertion regarding whether an individual earns a certain salary or has a job. Even though that assertion could be provided using information from one or more sources, the assertions model manager may choose to not provide assertions that can be used to issue a credit rating. Thus, the assertions model manager may execute a validation step before proceeding with generating a custom assertion.

In some embodiments, at step S604, the assertions model manager may determine what information is needed to provide the custom assertion, as well as a list of sources in possession of the information needed to provide the custom assertion.

In some embodiments, the custom assertion may have been pre-configured and defined in an assertions model. As described above, the assertions model manager may store a variety of pre-configured assertions models. The assertions model manager may look up the appropriate assertions model to use based on the received identifier of the relying entity. The identified assertions model may inform the assertions model manager of a list of information and criteria needed to provide the custom assertion. Alternatively, or additionally, the assertions model may specify sources from which the information may be obtained. The assertions model manager may look up this information within the assertions model using an identifier of the custom assertion specified in the request.

Alternatively, or additionally, the custom assertion may not have been pre-configured and defined in an assertions model. For example, the request may include a set of assertions requested by the relying entity, which do not correspond to a pre-defined assertions model. In this case, the assertions model manager may, in real-time, determine the sources in possession of the information needed to provide the custom assertion, as well as the information needed to provide the custom assertion. The assertions model manager may then generate the necessary assertions in a similar fashion as described above with respect to FIG. 4.

At step S606, the assertions model manager may filter the identified sources. The sources may, for example, be filtered using the set of criteria specified by the relying entity in the request, for which the custom assertion must meet. For instance, the relying entity specifies a minimum strength score value associated with the custom assertion. The assertions model manager may refrain from using data from any sources that have a strength score less than that minimum value. For example, the relying entity requests a custom assertion using data from multiple sources, each of which have at least a 80% strength score. The assertions model manager removes from consideration any sources that have a strength score lower than 80%, leaving behind a list of available sources (e.g., the usable sources that meet the set of criteria). As another example, the assertions model manager may filter the sources by selecting, of a set of available DI providers, the two DI providers having the highest strength scores.

At block S608, the assertions model manager may retrieve information from the available sources. The assertions model manager may transmit a request for information to a source. The assertions model manager may provide the source with an identifier of the target entity, an indication of the assertion, and/or an indication of information requested. For example, the assertions model manager may pass the identifier of the target entity to a bank, with a request for a particular type of identity attribute data—the target entity's home address. The assertions model manager may receive the home address from the bank in response.

Alternatively, or additionally, the assertions model manager may retrieve assertions that the assertions model manager has previously generated. The assertions model manager may, for example, access preexisting assertions from the ledger of assertions. The assertions model manager may retrieve the previous assertions for the target entity by looking up the assertions based on the identifier of the target entity that was specified in the received request. As another example, the assertions model manager may retrieve an assertion generated by a DI provider by transmitting a request for the assertion to the DI provider.

At step S610, the assertions model manager may generate a custom assertion based on the retrieved information or assertions. For instance, a custom assertion may involve multiple sources providing multiple, independent assertions for improved redundancy/reliability. In that case, the assertions model manager may simply confirm that all the assertions received from the multiple sources are in agreement, and the custom assertion may be the same. As another example, the custom assertion may involve multiple sources providing all the information or identity attribute(s) necessary to generate the custom assertion. In that case, the assertions model manager may factor in all that information and then generate the custom assertion itself.

In some embodiments, the custom assertion being requested may be a statement that is provided by the assertions model manager based on information retrieved from multiple sources. For example, a custom assertion may be the answer to, "Is this individual delinquent on any credit card accounts?", which may have to be resolved using information possessed by multiple entities (e.g., if the individual has credit card accounts across multiple entities). In such cases, the custom assertion could be made by the assertions model manager upon retrieving the necessary information from multiple financial entities at which the individual has a credit card account. For instance, each of the multiple entities may inform the assertions model manager that the individual is not delinquent for any credit card accounts at that entity, which will allow the assertions model manager to make the assertion that the individual is not delinquent on any of their credit card accounts. In these cases, each source used to make the custom assertion may still have its own strength score or risk score associated with it, which reflects the trustworthiness and reliability of the source and any information it provides. Furthermore, the custom assertion may also be associated with an overall strength score that may be determined based on the strength scores associated with each of the sources used.

At step S612, the assertions model manager may determine the dependability of the custom assertion and/or the sources used. The assertions model manager may, for example, determine a strength score or risk score for the custom assertion overall. The assertions model manager may verify that the overall strength score of the custom assertion is above a certain threshold. For example, the assertions model manager may check whether the probability that the custom assertion is true is 70% or higher. The threshold may be set, for example, by the relying entity. The assertions model manager may also check to ensure that each of the sources used or the assertions they provided have a strength score above a certain threshold.

There may be many different methods for calculating the strength score associated with a source, as well as the overall strength score of the custom assertion. In some embodiments, the overall strength score may simply be the lowest strength score among the sources used. For instance, the sources are a bank and a company. The bank has a strength score of 85% and the company has a strength score of 81%. The overall strength score of the custom assertion generated using information from the bank and the company is 81%. In some embodiments, the overall strength score of a custom assertion may increase based on the number of sources used that meet a minimum strength score. For example, the custom assertion requested is an answer to the question, "Is the individual a homeowner?". Data is obtained from multiple sources, and each provide the answer YES. Each source has a strength score of exactly 80%. The overall strength score of the custom assertion may be higher than 80% due to the number of confirming sources.

As another example, the overall strength score is equivalent to the lowest strength score among the sources used. The relying entity has specified a minimum acceptable strength score of 80%. This would ensure that each of the sources themselves are at least 80% reliable. An overall strength score of 81% for this custom assertion may reflect that the assertions model manager has determined, with 81% reliability, that the individual owns the home, or it may reflect that there is a 81% probability or likelihood that the individual owns the home.

In some embodiments, if the custom assertion's overall strength score does not meet the criteria received in the request from the relying entity, then the assertions model manager may recompute a modified custom assertion. The assertions model manager may, for example, filter out any underlying assertions with scores below a threshold value. The assertions model manager may reject an underlying assertion if that assertion's strength score does not meet the threshold value. The assertions model manager may identify more reliable sources to provide information for underlying assertions, until a custom assertion can be generated that meets the minimum acceptable strength score.

At step S614, the assertions model manager may provide the relying entity with the requested custom assertion. The assertions model manager may also indicate the sources used to generate the custom assertion, the overall strength score of the custom assertion, and/or the individual strength scores associated with the sources.

As a very specific example, the relying entity is a company that sells and installs expensive smoke alarms. However, due to regulations, these smoke alarms can only be sold to homeowners. Therefore, when a target entity seeks to purchase smoke alarms from the relying entity, the relying entity desires to know if the individual is a homeowner. It is very important that this assertion be correct because of the penalties associated with the regulations. Therefore, when a target entity seeks to purchase smoke alarms from the relying entity, the relying entity desires an assertion that the individual is a homeowner to be provided by multiple sources (e.g., multiple assertions that the individual is a homeowner). This would improve the likelihood that the individual is a homeowner. In the request to the assertions model manager, the relying entity may also specify that this custom assertion requires multiple information sources (e.g., at least two different sources), and it will only be accepted if it has a total strength score of at least 80%.

Thus, when the relying entity requests this assertion (e.g., an answer to the question, is the individual a homeowner?) to be provided from multiple sources, the assertions model manager may look to various sources, such as government records (or government agency posts in a public forum) and a financial entity, such as a bank. More specifically, one source that may exist in this scenario is a bank that provides a mortgage associated with the individual's home. The bank can assert that the individual is the mortgage holder. Another source that may exist in this scenario is a company that specifically deals in gathering external or public records for an individual (such as from tax records, local municipalities that publish ownership records on each of the land parcels in their governance, and so forth). Thus, the assertions model manager may then retrieve the assertion from multiple sources, with each source having its own reliability rating or strength score associated with it, which reflects the trustworthiness and reliability of the source and any assertion it provides (e.g., a score that reflects the overall reliability or trustworthiness of the entity providing information, the trustworthiness of the information or identity attribute(s) possessed by the entity, and so forth). Thus, the assertions model manager may then package these independent assertions together and return them as a custom assertion, which may also be associated with an overall reliability rating strength score that may be determined based on the strength scores associated with each of the sources used.

Providing a Clustered Assertion

Figure 7:
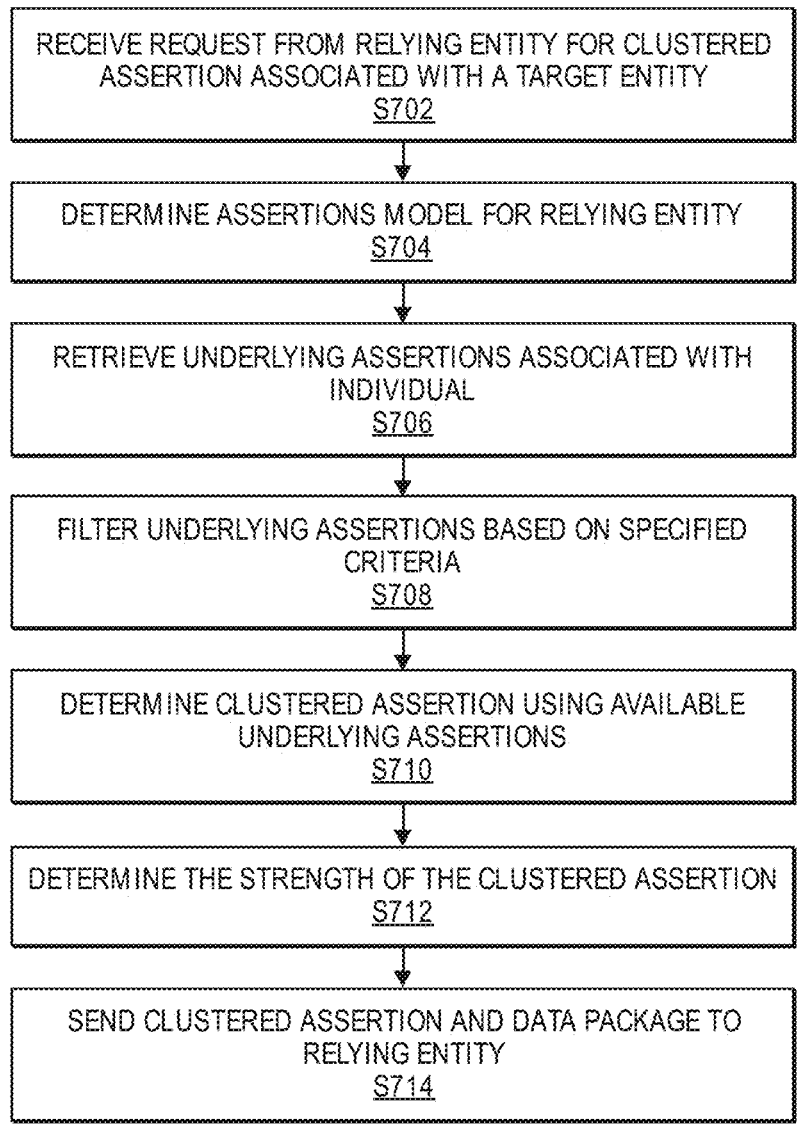
FIG. 7 is a flow diagram for a method of providing a clustered assertion, according to a non-limiting embodiment.

FIG. 7 is a flow diagram for a method of providing a clustered assertion, according to a non-limiting embodiment. FIG. 7 is best understood in the context of the example system 100 shown in FIGS. 1A-1B.

FIG. 7 illustrates operations for providing a clustered assertion (which may also be referred to as a "stacked assertion"). A clustered assertion may be a singular true/false or yes/no statement that is determined based on a combination of one or more assertions. Each of the underlying assertions may also be true/false or yes/no statements. Each of the underlying assertions may be independently determined from identity attribute(s) held in possession of one or more entities (e.g., from one or more DI providers and/or references). Combining assertions into a clustered assertion (e.g., a single answer) may be used for additional security reasons, such as to prevent profiling of individuals (e.g., by relying entities). There may be different methods for combining assertions into the clustered assertion. In some embodiments, an assertions model may also define a clustered assertion receivable by the relying entity, the underlying assertions used to generate that clustered assertion, and the method of combining any underlying assertions to generate the clustered assertion.

At step S702, the assertions model manager may receive a request from the relying entity for a clustered assertion associated with a particular target entity. The request may include an identifier of the relying entity, which can be used to determine the proper assertions model to use. The request may include an identifier of the target entity, which can be used to acquire the information and/or underlying assertions required to generate a clustered assertion for the target entity. In some embodiments, the request may also specify a particular clustered assertion or an identifier for that clustered assertion that the relying entity wishes to receive.

In some embodiments, the request may include one or more criteria to use for filtering the available underlying assertions that are used to generate a clustered assertion. For example, each available underlying assertion may be associated with a strength score (e.g., a score that reflects the overall reliability of that particular assertion, the trustworthiness of the entity providing that particular assertion, the trustworthiness of the identity attribute(s) used by the entity to provide that particular assertion, and so forth). In some embodiments, the requesting relying entity may set a minimum strength score for the underlying assertions. The clustered assertion would be determined based strictly on available underlying assertions that meet that minimum strength score.

At step S704, the assertions model manager determines an assertions model for the relying entity based on the received identifier of the relying entity. The assertions model manager may have a variety of pre-configured assertions models, one of which may be associated with that particular relying entity or the type of the relying entity. Thus, the assertions model manager may use the identity of the relying entity to look up the appropriate assertions model in order to determine which assertions and/or clustered assertions that relying entity is entitled to receive.

In some embodiments, the assertions model manager may look up the requested clustered assertion within the assertions model. The assertions model may establish the underlying assertions needed to generate the clustered assertion and/or a method of generating the clustered assertion based on the underlying assertions.

In some embodiments, at step S706, the assertions model manager may retrieve the underlying assertions associated with the target entity, which are required for generating the clustered assertion. In some embodiments, the assertions model manager may directly obtain the underlying assertions associated with the target entity from a database. For instance, the assertions model manager may retrieve assertion values from the ledger of assertions. The assertions model manager may retrieve the desired underlying assertions for the target entity by looking up that information based on the identifier of the target entity specified in the received request.

In some embodiments, one or more of the underlying assertions may not have been pre-generated and stored, or one or more of the underlying assertions may not be immediately accessible to the assertions model manager. The raw data used to make those underlying assertions may be associated with identity attribute(s) that are held in possession and stored by one or more separate entities, such as a DI provider. In this case, the assertions model manager may first generate an underlying assertion as described above with respect to FIG. 4. Alternatively, or additionally, the assertions model manager may retrieve an assertion which has been generated by a DI provider.

An underlying assertion may be based on identity attribute(s) that are possessed by one entity, or by multiple entities (e.g., multiple DI providers and/or references). For example, an underlying assertion is the answer to "Is the target entity delinquent on any credit card accounts?." The target entity has credit card accounts with multiple providers. Thus, the assertion relies on information possessed by multiple credit card providers. Each of the multiple credit card providers may inform the assertions model manager that the target entity is not delinquent for each respective credit card account, which will allow the assertions model manager to make the assertion that the target entity is not delinquent on any credit card accounts.

Thus, there may potentially be multiple entities involved in providing the underlying assertions used to generate the clustered assertion, as well as multiple entities involved in providing any identity attribute(s) used to generate one of those underlying assertions. There may not be a limit on the number of underlying assertions used to generate the clustered assertion. For example, the assertions model manager may be tasked with generating a clustered assertion that is based on ten or more underlying assertions that are stacked together.

At step S708, the assertions model manager may filter out any underlying assertions based on specified criteria made in the request from the relying entity. For example, the request may include a minimum strength score value acceptable by the relying entity. Only underlying assertions with a score that meets or exceeds the minimum strength score value may be used to generate the clustered assertion. For instance, the relying entity may only accept a clustered assertion if the underlying assertions each have a score of 4 out of 5 (which will preclude underlying assertions with scores below that).

At step S710, the assertions model manager may determine the clustered assertion using available underlying assertions. The method of generating the clustered assertion based on underlying assertions may be defined in the assertions model or held in an API definition. For instance, one method of generating the clustered assertion is to check to see if all underlying assertions are all YES, which would make the clustered assertion also a YES, but if any of the underlying assertions is a NO, then the clustered assertion becomes a NO. As another example, the assertions model manager may generate a clustered assertion which requires two or more of a set of three underlying assertions to be affirmative.

At step S712, the assertions model manager may compute an overall strength score associated with the clustered assertion. As described above with respect to FIGS. 4 and 6, the strength score may be generated in numerous ways. For example, the strength score may holistically generated and may take into account the individual scores of the underlying assertions and/or sources.

In some embodiments, if the clustered assertion's strength score does not meet the criteria received in the request from the relying entity, then the assertions model manager may recompute a modified clustered assertion. The assertions model manager may, for example, filter out any underlying assertions with scores below a threshold value. The assertions model manager may identify more reliable sources to provide information for underlying assertions, until a clustered assertion can be generated that meets the floor for the overall strength score.

At step S714, the assertions model manager may send the clustered assertion along with a data package to the relying entity. This data package may be associated with the clustered assertion and may include information corresponding to the clustered assertion, the assertions model used, the underlying assertions used to generate the clustered assertion, and so forth. Examples of information which may be included in the data package is described in detail below with respect to FIGS. 10-12.

As a very specific example, the relying entity is a bar that adheres to United States law (e.g., it serves alcoholic beverages only to customers over the age of 21). A target entity (e.g., a customer) wishes to purchase an alcoholic beverage. The relying entity must determine whether the target entity should be permitted to purchase an alcoholic beverage. Whether the target entity should be permitted to purchase an alcoholic beverage may depend upon two underlying assertions: (1) whether the target entity is over the age of 21 and (2) whether the target entity has a valid payment instrument available for purchasing the beverage. The relying entity transmits a request to the assertions model manager. The request comprises an identifier of the relying entity (a cryptographic key previously assigned to the relying entity), an identifier of the target entity (a cryptographic key previously assigned to the customer) and a minimum acceptable overall strength score for the clustered assertion.

The assertions model manager determines the type of relying entity requesting the assertions. Based on the first three digits of the ID number of the bar, the assertions model determines that the relying entity is a bar. The assertions model manager identifies a standardized assertions model associated with that type of relying entity (e.g., bars). The assertions model specifies two assertions: (1) whether the target entity is old enough to purchase an alcoholic beverage, and (2) whether the target entity has a valid payment instrument on file. For security reasons, it is desirable to prevent a subordinate party (e.g., the relying entity) from being able to profile the individual without the individual's permission. Thus, a clustered assertion is provided to the relying entity instead of a package of multiple assertions. The assertions model manager will generate a clustered assertion (e.g., a singular yes or no answer) based on the 2 assertions, which would correspond to the question—should the individual be permitted to purchase an alcoholic beverage?

The assertions model manager collects the assertion values corresponding to each of the assertion types defined in the assertions model. Based on the assertion values, the assertions model manager determines the combined answer. If all the underlying assertions are true, then the value of the clustered assertion is YES. If any of the underlying assertions are false, then value of the clustered assertion is NO. In this case, the assertions model manager would determine a yes VALUE for the clustered assertion to be a YES if both underlying assertion values were YES (e.g., the target entity is old enough to purchase an alcoholic beverage, and the target entity has a valid payment instrument on file). On the other hand, if either of the two underlying assertion values are NO, then the clustered assertion value would be NO. The relying entity would be able to receive a value of the clustered assertion overall, but not the value of any underlying assertions (e.g., the relying entity would not know which question(s) have a NO answer).

The assertions model manager may identify the minimum acceptable overall strength score for the package of assertions. The assertions model manager computes an overall strength score for the package of assertions, and compares the two. Based on determining that the computed overall strength score for the package of assertions exceeds the minimum acceptable strength score, the assertions model manager proceeds with preparing the package of assertions for transmission.

In some cases, it may be enough for the relying entity to trust the returned clustered assertion simply on the basis of trusting the assertions model manager. However, in some cases, it may be important for the relying entity to know if this clustered assertion meets some certain requirements, such as if the overall level of trust or reliability associated with the clustered assertion or a level of trust or reliability associated with each of the underlying assertions used to generate the clustered assertion. Thus, although the relying entity does not know the values of the underlying assertions, the relying entity may be provided additional information beyond simply the value of the clustered assertion, which can help the relying entity establish trust for the clustered assertion and the information used to generate the clustered assertion.

Creating a Digital Identity (DI)

Figure 8:
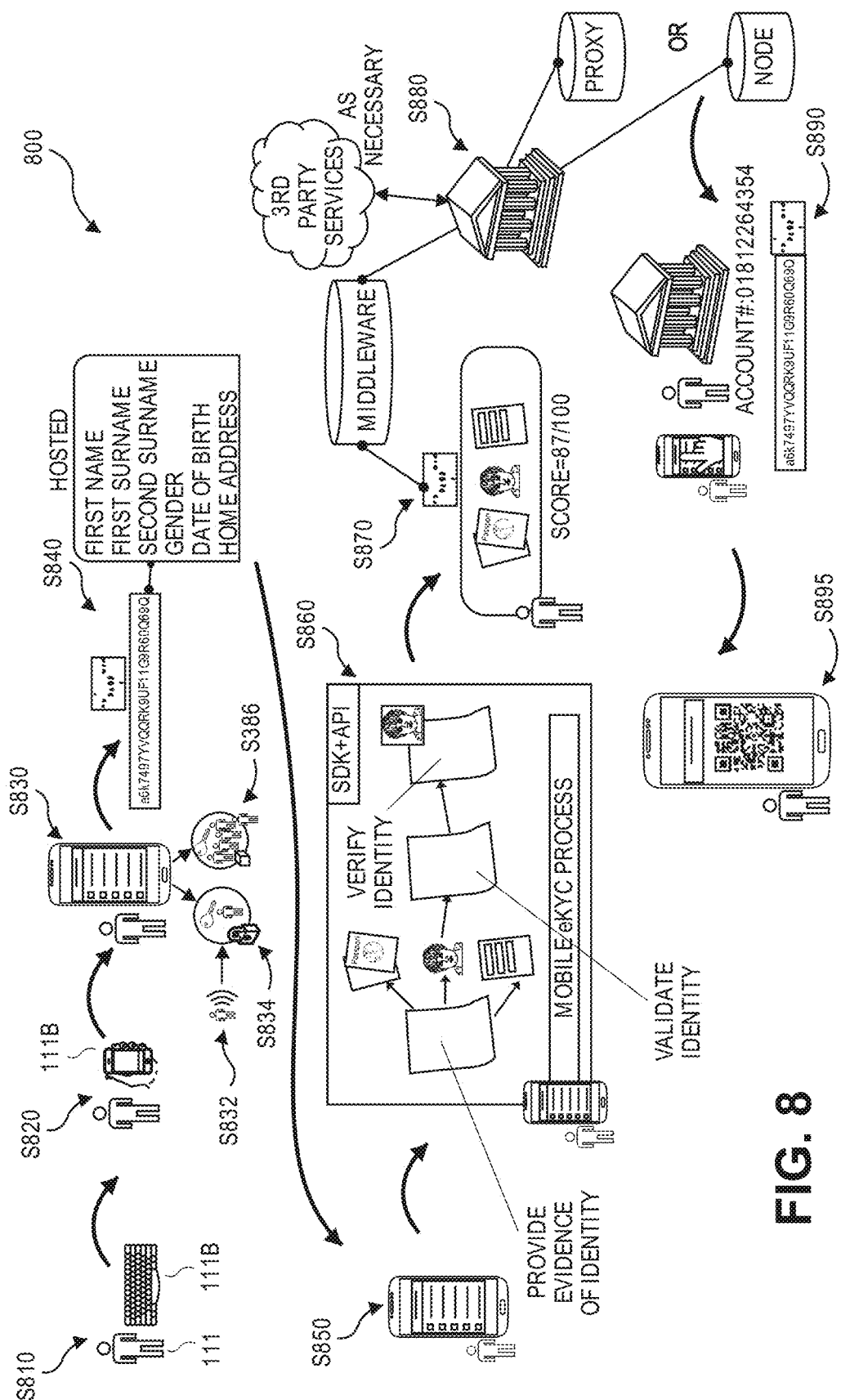
FIG. 8 is a schematic sequence diagram of a method for creating a digital identity (DI) according to a non-limiting embodiment.
Figure 9:
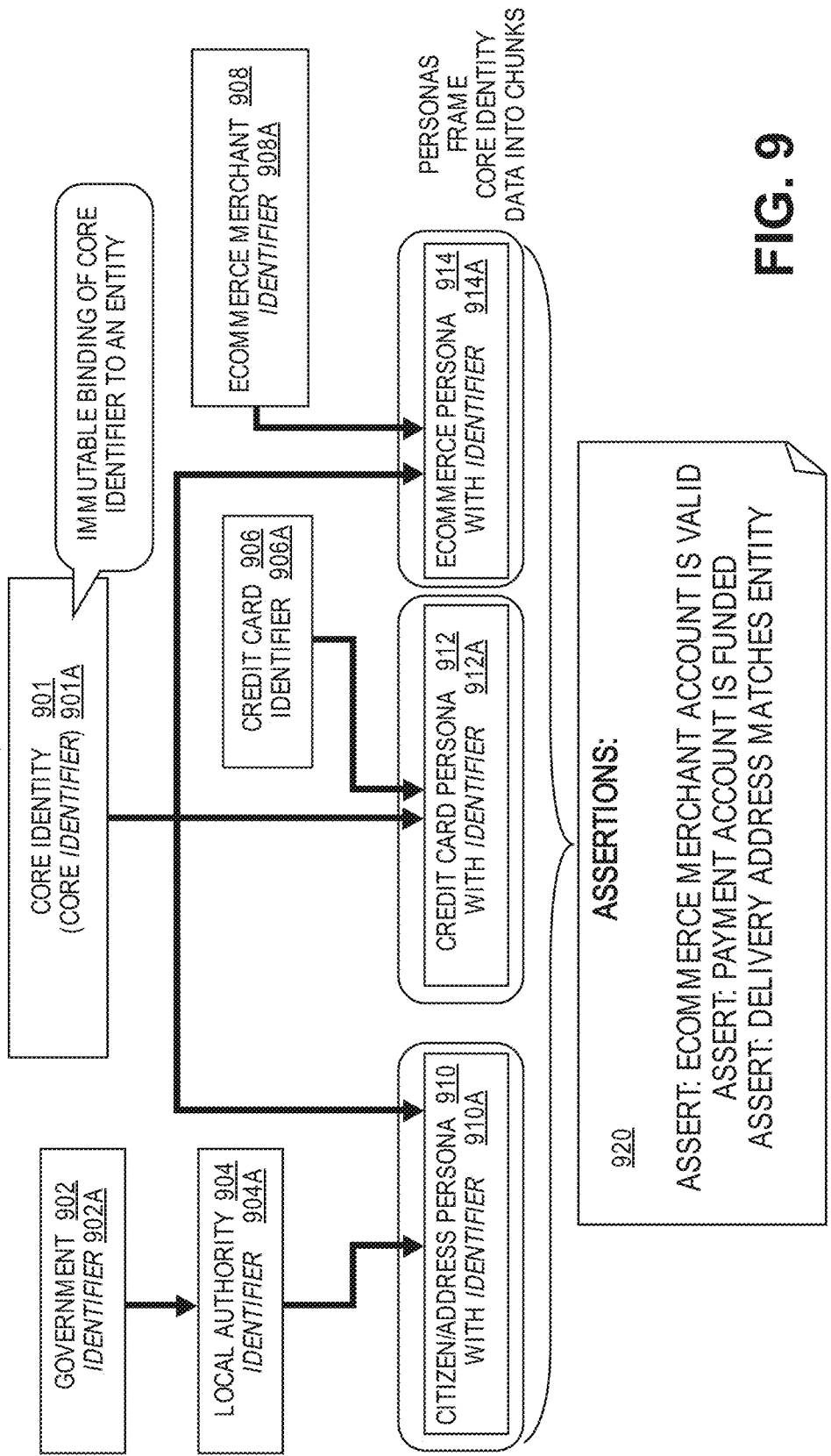
FIG. 9 illustrates example assertion models according to a non-limiting embodiment.

Referring now to FIG. 8, a schematic sequence diagram of a method 800 for creating a DI is shown according to a non-limiting embodiment.

At step S810, the target entity 111 can initiate communication with a DI provider 121 using a client device 111B.

Additionally or alternatively, at S820, the target entity 111 can download an application from the DI provider onto the client device 111B to initiate and/or continue communication with the DI provider 121.

At S830, the target entity 111 may complete registration with the DI provider 121 (e.g., by providing contact data, personal data, and/or the like). At step S832, the DI provider 121 may provide a public key (S836) and/or a private key (S834) to the target entity 111. For example, the private key can be based on a passphrase or biometric data provided by the target entity 111. Additionally or alternatively, the public key and/or private key can be based on a concatenation or hash of the data provided by the target entity 111 to complete registration (e.g., personal data, such as first name(s), surname(s), gender, and/or date of birth, or contact data, such as home address, telephone number, and/or email address, and/or the like).

At step S840, the DI provider or assertions model manager may generate a cryptographic key for the target entity 111. For example, the cryptographic key can be based on the private and/or public key(s) and can be suitable for writing data to a blockchain in a distributed ledger.

At step S850, the target entity 111 is walked through an account activation process, which can include providing identity attribute data, providing biometric data, and/or providing sources of identity attribute data to the DI provider 121. Additionally, at S860, sources of identity attribute information are verified by the DI provider 121, as described herein.

In some non-limiting embodiments, at S870, a strength/confidence score may be determined based on the source(s) of identity attribute data, and the identity attribute data and the score data may be combined as a DI of the target entity 111. Additionally or alternatively, the DI can be communicated to the DI provider (e.g., directly or indirectly through an API or middleware).

With continued reference to FIG. 8, at step S880, the DI of the target entity 111 can be stored in a DI database 121A at the DI provider 121. Additionally or alternatively, the DI provider 121 can obtain additional identity attribute data from third parties as necessary to complete the DI (e.g., if the target entity 111 was not able to supply the certain data or if the valid source(s) of such data are third parties). Additionally or alternatively, the DI provider 121 can verify that the DI is complete and communicate a notification to the target entity 111 indicating verification/approval of the DI.

At step S890, the DI of the target entity 111 stored by the DI provider 121 can be used to transmit a set of assertions corresponding to an assertions model, as described herein. For example, the set of assertions can be written to a blockchain in a distributed ledger using the cryptographic key of the entity and/or the cryptographic key of the DI provider 121, as described herein. Additionally or alternatively, at S895, the target entity 111 can provide data associated with the cryptographic key of the target entity 111 to a relying entity 161. For example, the data associated with the cryptographic key of the target entity 111 can be a code including but not limited to a bitstring, a quick response (QR) code, a barcode, and/or the like.

Example Embodiment—Personas

As an example, each package of assertions may correspond to a different "persona" for the target entity. The target entity's overarching digital identity (core identity 901) may be thought of as an assertion cluster. This assertion cluster may be carved into personas corresponding to different aspects of the target entity's digital identity.

These different aspects of the target entity's digital identity are associated with different types of requesting entities. One type of requesting entity is the government 902, which may be identified via an identifier of the requesting entity 902A. Another type of requesting entity is a local authority 904, which may be identified via an identifier of the requesting entity 904A.

The government 902 and the local authority 904 both correspond to a same type of requesting entity and a same type of persona (e.g., package of assertions)—the citizen/address persona 910. This persona may, in turn, be associated with an identifier 901A.

Another type of requesting entity is a credit card processor 906 (e.g., a merchant or other party involved in payment transactions). The credit card processor may be identified via identifier 906A.

The credit card processor may be tied to a credit card persona 912 which may, in turn, have its own identifier 912A.

Another type of requesting entity is an ecommerce merchant 908. Each ecommerce merchant may have a corresponding identifier 908A, which identifies it as an ecommerce merchant (e.g., type of relying entity).

The system may establish an ecommerce persona 914 for ecommerce merchants 908. The ecommerce persona 914 may have an identifier 914A.

The personas (910, 912, 914) frame the core identity data 901 into chunks. A package of assertions 920 is shown, which may correspond to the ecommerce persona 914 for ecommerce merchants 908. The package of assertions 920 may be provided to an ecommerce merchant 908, based on the ecommerce merchant's identifier 908A. The ecommerce merchant's identifier 908A may map to the ecommerce persona identifier 914A, indicating that the appropriate package of assertions is that corresponding to the ecommerce persona.

A user attempts to purchase a television from an ecommerce merchant. The ecommerce merchant is provided a package of assertions corresponding to the user's ecommerce persona. The package of assertions includes the assertions "Ecommerce merchant account is valid," "payment account is funded," and "delivery address matches entity."

Example Assertion Package Information

FIGS. 10-12 are examples of information contained in a data package sent with a package of assertions, according to non-limiting embodiments.

As seen in FIG. 10, the data package may include a set of information that is applicable to all the underlying assertions used to generate the package of assertions. This may include identifiers (Assertions model ID), names (Assertions model Name), descriptors (Assertions model Descriptor), and dates (Assertions model Date) associated with the particular assertions model that was used (e.g., the one referenced based on the relying entity's identifier). This may also include identifiers of the trusted authority signing all of the assertions which may include the assertions model manager (Assertion Trusted Authority ID), identifiers of the entities making the underlying assertions which may include the assertions model manager (Assertion Updater ID), the sources of data or identity attribute(s) used to make the underlying assertions (Assertion Valid Sources), and a description or URL for the algorithm used to score the underlying assertions (Assertion Scoring Link).

As seen in FIG. 11, the data package may also include a set of information for each of the underlying assertions used to generate the package of assertions. This may include the name (Assertion Name), identifier (Assertion ID), type (Assertion Type), and date scope (Assertion Date Scope) for each underlying assertion used. The date scope may reference the start date, end date (e.g., expiration date), and/or half-life associated with that underlying assertion. For example, an underlying assertion may be made based on a driver's license that expires in a week, which means that the underlying assertion would only be valid for a week.

In some embodiments, the information may or may not also include a value for the underlying assertion (Assertion Value). In the case of a clustered assertion, the assertion values for the underlying assertion may be omitted from the data package. Alternatively, the underlying assertion values may be included in the data package but may not be accessible to the relying entity. For instance, the data package may be encrypted and the relying entity may not be able to access the data package in order to scrutinize the underlying assertion values used to generate the clustered assertion. Instead, the relying entity may store the received data package for evidence in order to resolve any later disputes. For instance, if the relying entity is at fault due to a received clustered assertion (e.g., a bar serves alcohol to a person they should not have), the relying entity may be able to furnish the data package associated with that clustered assertion to absolve themselves of fault and to determine how the mistake was made (e.g., determine that the value of a particular underlying assertion was incorrect). Alternatively, only the values for each underlying assertion may be encrypted to achieve the same effect.

The information may also include the source document used for that particular underlying assertion (Assertion Source), the calculated strength score associated with that particular underlying assertion (Assertion Strength score), a signature associated with the individual associated with that particular underlying assertion (Assertion Entity signature), a signature associated with the trusted authority signing that particular underlying assertion (Assertion Trusted Authority ID), a digital signature of the entity providing the particular underlying assertion (Assertion Updater ID), and an identifier of the assertions model used when making that particular underlying assertion (Assertions model ID). This information, such as the assertions model ID, is listed for each underlying assertion because a particular underlying assertion may have been made and stored prior to this particular relying entity's request. It is possible that all the underlying assertions used to generate the clustered assertion were made at different times. Keeping track of this information in the data package allows the data package to serve as a complete record, such as to identify the assertions model used when any particular underlying assertion was made.

As seen in FIG. 12, the data package may also include a set of information for each package of assertions (in case more than one package of assertions is sent). This information may include a name or descriptor of the data package (Package Name), an identifier of the data package (Package ID) which includes an index number that allows the data package to be referenced in a database or distributed ledger, and a date scope associated with the data package or package of assertions assertion (Package Date Scope).

The package date scope may inform of a start and end date (e.g., expiration date) associated with the package of assertions. For instance, a relying entity may receive a package of assertions but desire to know how long that clustered assertion is valid for (e.g., valid for a week, valid for three months, and so forth). In some embodiments, a package of assertions may have a date scope that corresponds to the underlying assertion with the most-restrictive date scope (e.g., the earliest expiration date among the underlying assertions). For example, a particular package of assertions, which is a clustered assertion, may be a calculated result based on three underlying assertions. One of the three assertions may be based on a valid driver's license on file, with that license expiring next week. The other two assertions may be based on information that is valid for another year. However, since this clustered assertion is determined based on all three assertions, this clustered assertion would also have a date scope of a week (e.g., it would expire next week) because it would no longer be valid once the driver's license expires.

The data package may also include a name or descriptor of the package of assertions (Assertion Name) and a strength score associated with the package of assertions (Assertion Strength score). The data package may also reference a particular assertions model (Assertions model ID) used to generate the package of assertions and also describe the underlying assertions supported in the assertions model (not shown in FIG. 12). For instance, the data package may list the assertions in the model: TAAffirmEnty, EntyValidStateDoc, EntyPrivacyJuris, EntyTATenureGE, TARawDataTfr, EntyAgeGE, EntyVfyDepAcct, EntyPmtTok, EntyEdCert, and EntyMember. Thus, if the assertions model changes, then it can be determined that all underlying assertions based on the older assertions model will need to be updated.

Advantages; Extensions

The teachings of this disclosure have a number of advantages. A package of assertions may be generated based on data from multiple DI providers. This can allow for increased confidence in the resulting package of assertions, as the data may be verified by multiple sources. Further, the data from multiple DI providers may be integrated into more complex assertions generated from data only available from disparate sources. Additionally, the relying entity can be informed of the reliability and trustworthiness of a package of assertions based on the sources that provide the assertion or provide information used to make the assertion. The system may generate strength scores associated with the sources of the package of assertions and provide those scores to the relying entity. The relying entity may factor in these strength scores to consider the chances that the information sources are trustworthy.

Embodiments have a number of additional advantages. For example, some embodiments use assertions models customized for different types of relying entities to generate multiple assertions packages for a given target entity. The different assertions packages may be made available to different types of relying entities in a secured manner using private and public keys. As a result, only the appropriate relying entities will be able to retrieve appropriate corresponding assertions packages. These assertions packages may be generated at an initial time. By using preexisting, tailored assertions packages, the relying entities can quickly be granted an assertion. There is no need to recompute a given assertion package for multiple relying entities of a same type. Hence, computational time and resources are saved while ensuring a high degree of privacy and security.

Further, the packages of assertions may be stored as entries to a distributed ledger. Using a distributed ledger approach for the assertions provides numerous advantages. The assertion data is provable, in that entries can be attributable to specific entities cryptographically. The assertion data is non-repudiable, in that entries cannot later be altered or deleted. The assertion data is sequential, as the order of every entry is provable before, or after, every other entry. The assertion data is ubiquitous and available from any reasonable vector. The assertion data is survivable, even if large numbers of the distributed nodes fail or are under attack. The data is highly available, with high throughput. The assertion data is trustable by the entities involved.

Further, it is advantageous to generate an assertion which answers the relying entity's question on a need-to-know basis, in order to ensure privacy. For example, the system can inform the relying entity that the target entity is old enough to buy liquor without revealing the target entity's actual age, or any other information that may be revealed on a driver's license, such as the target entity's name or address. This can be taken a step further by using a clustered assertion which is based on multiple underlying assertions. For example, the relying entity may be informed that the target entity should not be granted access to a building, without revealing the answer to any of the underlying assertions used to make that determination (e.g., whether the target entity is an employee, whether the target entity has a valid security clearance, and whether the target entity is staffed on a project corresponding to the location). Accordingly, the teachings of the present disclosure The teachings of the present disclosure provide several advantages for the target entity for which information is being requested. The target entity can control privacy by customizing what information can be revealed to what relying entities. Further, various different types of information required by various relying entities is streamlined into a single channel. The target entity can simply provide an identifier (e.g., an ID number, or a QR code) and, based on the type of the relying entity, the appropriate information can be extracted. This can alleviate the need for the target entity to carry a wallet or multiple sources of identification, payment, etc.

The teachings of the present disclosure provide several advantages for the relying entity requesting information. First, by providing the above-referenced advantages to the target entities (e.g., customers of the relying entity, employees of the relying entity, etc.), the relying entity is providing a better experience for the target entity. In the case of a merchant, increased customer experience may lead to increased sales. Further, the teachings of the present disclosure can provide increased fraud protection by verifying data across multiple channels, using advanced cryptographic techniques.

It should be understood that any of the embodiments be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium according to an embodiment may be created using a data signal encoded with such programs. Computer readable media encoded with the program code may be packaged with a compatible device or provided separately from other devices (e.g., via Internet download). Any such computer-readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the embodiments will become apparent to those skilled in the art upon review of the disclosure. The scope of the embodiments should, therefore, be determined not with reference to the above description, but instead should be determined with reference to the pending claims along with their full scope or equivalents.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

One or more features from any embodiment may be combined with one or more features of any other embodiment without departing from the teachings of this disclosure.

As used herein, the use of "a," "an," or "the" is intended to mean "at least one," unless specifically indicated to the contrary.

What is claimed is:

1. A method comprising:
receiving, from a relying entity, a request for one or more assertions for a target entity, wherein the one or more assertions are secure facts about the target entity that are based on underlying attribute data of the target entity and do not reveal the underlying attribute data of the target entity;
determining a plurality of assertion values for the target entity;
identifying a subset of the plurality of assertion values for the target entity;
generating a package of assertions for the target entity, based on the subset of the plurality of assertion values for the target entity; and transmitting, to the relying entity, the package of assertions for the target entity,
wherein determining the plurality of assertion values comprises, for each assertion value, of the plurality of assertion values:
determining a type of assertion corresponding to the assertion value;
determining a type of identity attribute corresponding to the type of assertion;
obtaining identity attribute data associated with the target entity corresponding to the type of identity attribute; and
determining the assertion value corresponding to the type of assertion based on the identity attribute data associated with the target entity.

2. The method of claim 1, further comprising identifying an assertions model, wherein the subset of the plurality of assertion values for the target entity are based on a set of assertion types specified by the assertions model.

3. The method of claim 1, wherein transmitting the package of assertions for the target entity comprises transmitting the package of assertions using one or more of: a cryptographic key for the target entity or a cryptographic key for the relying entity.

4. The method of claim 1, wherein:
the request further comprises a set of filter criteria;
the set of filter criteria comprises a minimum acceptable strength score for a plurality of sources corresponding to the identity attribute data; and
each source, of the plurality of sources, is associated with a strength score that meets the minimum acceptable strength score.

5. The method of claim 4, further comprising:
calculating an overall strength score for the package of assertions based on the strength score associated with each source of the plurality of sources; and
transmitting, to the relying entity, the overall strength score for the package of assertions and the strength score associated with each source of the plurality of sources.

6. The method of claim 5, wherein the overall strength score for the package of assertions is based on a lowest strength score among the plurality of sources.

7. The method of claim 1, wherein the request further comprises a set of filter criteria and the method further comprises ensuring the package of assertions for the target entity meets the set of filter criteria wherein the package of assertions comprises two or more distinct assertion values for the target entity.

8. The method of claim 1, wherein determining the assertion value corresponding to the type of assertion comprises calculating the assertion value corresponding to the type of assertion.

9. The method of claim 1, further comprising:
determining a plurality of sources and a set of information to retrieve from the plurality of sources, wherein the set of information is necessary for generating the package of assertions;
retrieving the set of information from the plurality of sources;
generating the package of assertions for the target entity based on the set of information; and
transmitting, to the relying entity, the package of assertions for the target entity.

10. The method of claim 1, wherein transmitting the package of assertions for the target entity comprises writing the package of assertions to a distributed ledger.

11. The method of claim 1, wherein the package of assertions comprises a singular answer based on the subset of the plurality of assertion values.

12. The method of claim 11, further comprising calculating an overall score for the package of assertions based on a strength score associated with each assertion value, of the subset of the plurality of assertion values.

13. The method of claim 1, wherein at least one assertion value, of the plurality of assertion values in the package of assertions comprises an expiration date.

14. The method of claim 1, further comprising generating an event in an event log, the event being associated with the transmitting of the package of assertions.

15. The method of claim 1, wherein the subset of the plurality of assertion values for the target entity are retrieved from a database.

16. A system comprising:
a server computer comprising:
a processor; and
a non-transitory computer-readable medium comprising code, executable by the processor, to implement a method comprising:
receiving, from a relying entity, a request for one or more assertions for a target entity wherein the one or more assertions are secure facts about the target entity that are based on underlying attribute data of the target entity and do not reveal the underlying attribute data of the target entity;
determining a plurality of assertion values for the target entity;
identifying a subset of the plurality of assertion values for the target entity;
generating a package of assertions for the target entity, based on the subset of the plurality of assertion values for the target entity; and
transmitting, to the relying entity, the package of assertions for the target entity,
wherein determining the plurality of assertion values comprises, for each assertion value, of the plurality of assertion values:
determining a type of assertion corresponding to the assertion value and a type of identity attribute corresponding to the type of assertion;
obtaining identity attribute data associated with the target entity corresponding to the type of identity attribute; and
determining the assertion value corresponding to the type of assertion based on the identity attribute data associated with the target entity.

17. A system comprising:
a relying entity computer comprising:
a processor; and
a non-transitory computer-readable medium comprising code, executable by the processor, to implement a method comprising:
transmitting a request for one or more assertions for a target entity, wherein the one or more assertions are secure facts about the target entity that are based on underlying attribute data of the target entity and do not reveal the underlying attribute data of the target entity; and
responsive to the request, receiving a package of assertions for the target entity, wherein the package of assertions comprises a subset of a plurality of assertion values for the target entity, determined based on an assertions model, wherein the assertions model includes assertion values and underlying attributes associated with those assertion values.

\* \* \* \* \*